(12) United States Patent
Cai et al.

(10) Patent No.: US 12,475,423 B1
(45) Date of Patent: Nov. 18, 2025

(54) INTELLIGENT OPERATION AND MAINTENANCE OPTIMIZATION METHOD AND INTELLIGENT PRODUCTION OPTIMIZATION METHOD FOR OFFSHORE OIL SUBSEA PRODUCTION SYSTEM (SPS), AND SYSTEM

(71) Applicants: China University of Petroleum (East China), Qingdao (CN); OCEAN UNIVERSITY OF CHINA, Qingdao (CN); China University of Petroleum, Beijing, Beijing (CN)

(72) Inventors: Baoping Cai, Qingdao (CN); Xiaoyan Shao, Qingdao (CN); Yonghong Liu, Qingdao (CN); Chao Yang, Qingdao (CN); Yanping Zhang, Qingdao (CN); Xuelin Liu, Qingdao (CN); Rui Zhang, Qingdao (CN); Chenyushu Wang, Qingdao (CN); Yingying Wang, Beijing (CN); Wanhai Xu, Tianjin (CN); Guijie Liu, Qingdao (CN); Xincheng Li, Yantai (CN); Qibing Wu, Tianjin (CN); Lei Gao, Shenzhen (CN); Weifeng Ge, Tianjin (CN); Zhongfei Sui, Dongyang (CN); Zheng Yuan, Tianjin (CN)

(73) Assignees: China University of Petroleum (East China), Qingdao (CN); OCEAN UNIVERSITY OF CHINA, Qingdao (CN); China University of Petroleum, Beijing, Beijing (CN)

( * ) Notice: Subject to any disclaimer, the term of this patent is extended or adjusted under 35 U.S.C. 154(b) by 0 days.

(21) Appl. No.: 19/022,435

(22) Filed: Jan. 15, 2025

(30) Foreign Application Priority Data

Jul. 24, 2024 (CN) .......................... 202410994234.6

(51) Int. Cl.
*G06Q 10/0637* (2023.01)
*G05B 23/02* (2006.01)
(Continued)

(52) U.S. Cl.
CPC ..... *G06Q 10/0637* (2013.01); *G05B 23/0283* (2013.01); *G06Q 10/04* (2013.01); *G06Q 10/20* (2013.01); *G06Q 50/02* (2013.01)

(58) Field of Classification Search
CPC ...... G06N 3/084; G06N 3/0442; G06Q 10/20; G06Q 10/04; G06Q 10/0637; G06Q 50/02;
(Continued)

(56) References Cited

U.S. PATENT DOCUMENTS

2009/0056949 A1* 3/2009 McStay .............. G01N 21/8507
166/337

OTHER PUBLICATIONS

Zhao et al., "Optimization of Leakage Risk and Maintenance Cost for a Subsea Production System Based on Uncertain Fault Tree", Published: Feb. 13, 2023 (Year: 2023).*

(Continued)

*Primary Examiner* — John H Le
(74) *Attorney, Agent, or Firm* — WCF IP

(57) ABSTRACT

Provided are an intelligent operation and maintenance optimization method and intelligent production optimization method for an offshore oil subsea production system (SPS), and a system, relating to the field of petroleum engineering. The operation and maintenance optimization method includes: determining whether there is a leak in an SPS; and if there is a leak, performing emergency repair; or if there is no leak, performing intelligent operation and maintenance optimization. The performing intelligent operation and maintenance optimization includes: calculating a static health index of the SPS based on ashore sensor status data (Continued)

and Christmas tree sensor data; obtaining dynamic health indexes at different moments through a Kalman filtering algorithm; and formulating an optimal maintenance strategy for the SPS with optimization objectives of maximizing toughness and minimizing a maintenance cost.

21 Claims, 6 Drawing Sheets

(51) Int. Cl.
  *G06Q 10/04* (2023.01)
  *G06Q 10/20* (2023.01)
  *G06Q 50/02* (2024.01)
(58) Field of Classification Search
  CPC .. G06F 30/28; G06F 2111/06; G06F 2119/02; G06F 2119/04; G06F 2119/14; G06F 2113/08; G05B 23/0283
  USPC ......................................................... 702/184
  See application file for complete search history.

(56) References Cited

OTHER PUBLICATIONS

Wang et al., CN 202691439, "Long-distance Pipeline Quick Emergency Repair Clamp Cam", Date published: Jan. 23, 2013 (Year: 2013).*

* cited by examiner

INTELLIGENT OPERATION AND MAINTENANCE OPTIMIZATION METHOD AND INTELLIGENT PRODUCTION OPTIMIZATION METHOD FOR OFFSHORE OIL SUBSEA PRODUCTION SYSTEM (SPS), AND SYSTEM

CROSS REFERENCE TO RELATED APPLICATION

This patent application claims the benefit and priority of Chinese Patent Application No. 2024109942346, filed with the China National Intellectual Property Administration on Jul. 24, 2024, the disclosure of which is incorporated by reference herein in its entirety as part of the present application.

TECHNICAL FIELD

The present disclosure relates to the field of petroleum engineering, and in particular, to an intelligent operation and maintenance optimization method and intelligent production optimization method for an offshore oil subsea production system (SPS), and a system.

BACKGROUND

With increasing global demand for energy, offshore oil exploitation has become one of the important ways to meet energy demand. An offshore oil SPS is a highly complex engineering system, including a wellhead device, an oil well pipeline, a production platform, and the like. This system is usually located in a harsh environment, such as deep sea, and its operation and maintenance is critical to ensuring production efficiency and safety.

However, complexity and uncertainty of a subsea operating environment pose a series of challenges to a traditional SPS. Due to harsh nature of a marine environment, devices of the SPS are vulnerable to corrosion, particle deposition, and the like, resulting in a device fault and performance degradation. Because subsea operations have high costs and risks, a traditional periodic maintenance mode often cannot meet requirements of real-time monitoring and rapid response, thus affecting production efficiency.

SUMMARY

An objective of the present disclosure is to provide an intelligent operation and maintenance optimization method and intelligent production optimization method for an offshore oil SPS, and a system. A remaining useful life can be predicted based on an operation status of an SPS, to optimize operation and maintenance and production schemes and improve production efficiency.

To achieve the foregoing objective, the present disclosure provides the following technical solutions:

An intelligent operation and maintenance optimization method for an offshore oil SPS is provided, including the following steps:
  determining whether there is a leak in an SPS; and
  if there is a leak in the SPS, performing emergency repair; or
  if there is no leak in the SPS, performing intelligent operation and maintenance optimization.
The performing emergency repair includes:
  determining a leak position of the SPS; and
  immediately repairing the SPS based on the leak position.

The performing intelligent operation and maintenance optimization includes:
  calculating a static health index of the SPS based on ashore sensor status data and Christmas tree sensor data of the SPS;
  estimating dynamic health indexes of the SPS at different moments through a Kalman filtering algorithm by using the static health index of the SPS as a dynamic health index at an initial moment;
  calculating toughness of the SPS under different maintenance strategies based on the dynamic health indexes at different moments;
  constructing a multi-objective optimization function with optimization objectives of maximizing the toughness and minimizing a maintenance cost of the SPS;
  solving the multi-objective optimization function through a multi-objective optimization solution algorithm to obtain an optimal maintenance strategy for the SPS; and
  maintaining the SPS based on the optimal maintenance strategy.

An intelligent production optimization method for an offshore oil SPS is provided, including the following steps:
  calculating a static health index of an SPS based on ashore sensor status data and Christmas tree sensor data of the SPS;
  determining whether production indicator parameters of the SPS under a current production strategy meet production optimization conditions, where the production indicator parameters include oil and gas production, energy consumption during production, the static health index, and reliability; and
  if the production optimization conditions are met, obtaining an optimal production strategy for the SPS through a multi-objective optimization algorithm with optimization objectives of maximizing the oil and gas production and a remaining useful life and minimizing the energy consumption during production of the SPS.

The remaining useful life is calculated through the following steps:
  estimating dynamic health indexes of the SPS at different moments through a Kalman filtering algorithm by using the static health index of the SPS as a dynamic health index at an initial moment; and
  calculating remaining useful lives of the SPS under different production strategies based on the dynamic health indexes at different moments.

A computer system is provided, including a memory, a processor, and a computer program stored in the memory and executable on the processor. The processor executes the computer program to implement the foregoing intelligent operation and maintenance optimization method or intelligent production optimization method.

Based on specific embodiments provided in the present disclosure, the present disclosure has the following technical effects:

The embodiments of the present disclosure provide the intelligent operation and maintenance optimization method and intelligent production optimization method for an offshore oil SPS. The operation and maintenance optimization method includes the following steps: determining whether there is a leak in the SPS; and if there is a leak in the SPS, performing emergency repair, or if there is no leak in the SPS, performing intelligent operation and maintenance optimization. The performing emergency repair includes: determining the leak position of the SPS; and immediately repairing the SPS based on the leak position. The performing intelligent operation and maintenance optimization includes: calculating the static health index of the SPS based on the ashore sensor status data and the Christmas tree sensor data of the SPS; estimating the dynamic health indexes of the SPS at different moments through the Kalman filtering algorithm by using the static health index of the SPS as the dynamic health index at the initial moment; calculating the toughness of the SPS under different maintenance strategies based on the dynamic health indexes at different moments; constructing the multi-objective optimization function with the optimization objectives of maximizing the toughness and minimizing the maintenance cost of the SPS; solving the multi-objective optimization function through the multi-objective optimization solution algorithm to obtain the optimal maintenance strategy for the SPS; and maintaining the SPS based on the optimal maintenance strategy. In the embodiments of the present disclosure, the static health index is determined based on the ashore sensor status data and the Christmas tree sensor data of the SPS, the dynamic health indexes are estimated based on the Kalman filtering algorithm, and then maintenance and production are optimized based on the dynamic health indexes, to dynamically adjust maintenance and production based on an actual status and improve production efficiency.

BRIEF DESCRIPTION OF THE DRAWINGS

To describe the technical solutions in embodiments of the present disclosure or in the prior art more clearly, the accompanying drawings required for the embodiments are briefly described below. Apparently, the accompanying drawings in the following description show merely some embodiments of the present disclosure, and those of ordinary skill in the art may still derive other accompanying drawings from these accompanying drawings without creative efforts.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide an intelligent operation and maintenance optimization method and intelligent production optimization method for an offshore oil SPS, and a system. A remaining useful life can be predicted based on an operation status of an SPS, to optimize operation and maintenance and production schemes and improve production efficiency.

To make the foregoing objective, features, and advantages of the present disclosure clearer and more comprehensible, the present disclosure will be further described in detail below with reference to the accompanying drawings and specific embodiments.

Embodiment 1

Embodiment 1 of the present disclosure provides an intelligent operation and maintenance optimization method for an offshore oil SPS.

Figure 1:
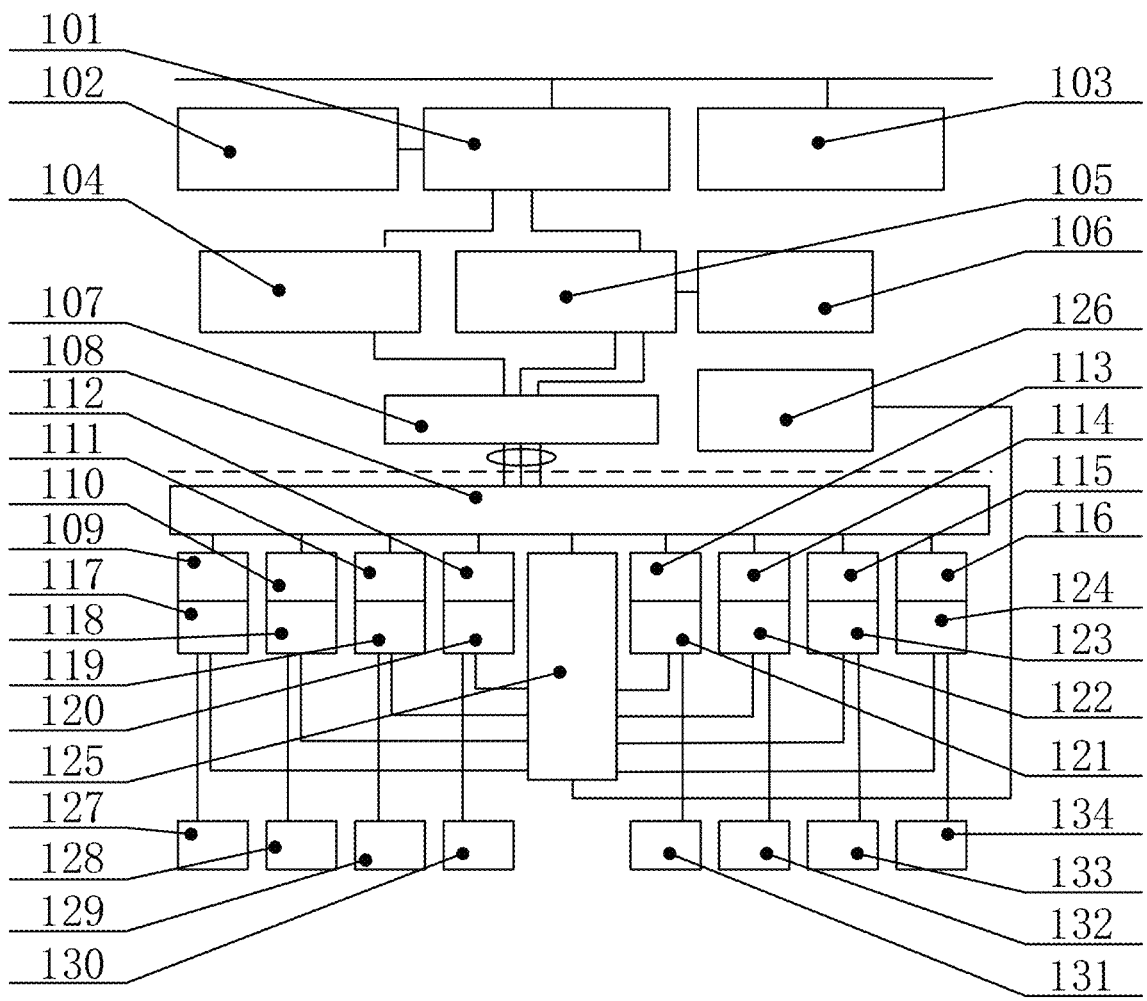
FIG. 1 is a structural diagram of an SPS according to an embodiment of the present disclosure.

As shown in FIG. 1, an SPS includes a master control station 101, an emergency shutdown apparatus 102, a workstation 103, a hydraulic power unit 104, an electrical power unit 105, an uninterruptible power supply 106, an umbilical 107, a subsea distribution unit 108, a first subsea control module 109, a second subsea control module 110, a third subsea control module 111, a fourth subsea control module 112, a fifth subsea control module 113, a sixth subsea control module 114, a seventh subsea control module 115, an eighth subsea control module 116, a first Christmas tree 117, a second Christmas tree 118, a third Christmas tree 119, a fourth Christmas tree 120, a fifth Christmas tree 121, a sixth Christmas tree 122, a seventh Christmas tree 123, an eighth Christmas tree 124, a central manifold 125, an offshore crude oil production device 126, a first electric submersible pump 127, a second electric submersible pump 128, a third electric submersible pump 129, a fourth electric submersible pump 130, a fifth electric submersible pump 131, a sixth electric submersible pump 132, a seventh electric submersible pump 133, and an eighth electric submersible pump 134. The master control station 101 is connected to the hydraulic power unit 104 and the electrical power unit 105 through cables, and is configured to control overall operation of the SPS and monitor data acquisition. The emergency shutdown apparatus 102 is connected to the master control station 101 through a cable, and is configured to perform emergency shutdown of the SPS. The workstation 103 is connected to the master control station 101 through a cable, and is configured to store monitoring data of the SPS. The hydraulic power unit 104 is connected to the umbilical 107 through a hydraulic pipeline, and is configured to provide high- and low-pressure oil for the downhole. The electrical power unit 105 is connected to the umbilical 107 through two cables, and is configured to provide electrical power and communication for the downhole. The uninterruptible power supply 106 is connected to the electrical power unit 105 through a cable, and is configured to provide electrical drive for the SPS. The umbilical 107 is connected to the subsea distribution unit 108 through a hydraulic pipeline and two cables, and is configured to transmit hydraulic pressure, electrical power, and communication. The subsea distribution unit 108 is connected to the first subsea control module 109, the second subsea control module 110, the third subsea control module 111, the fourth subsea control module 112, the fifth subsea control module 113, the sixth subsea control module 114, the seventh subsea control module 115, the eighth subsea control module 116, and the central manifold 125 through cables, and is configured to distribute subsea pressure power and electrical power. The first subsea control module 109 is connected to the first Christmas tree 117 through a cable, and is configured to control and monitor the first Christmas tree 117. The second subsea control module 110 is connected to the second Christmas tree 118 through a cable, and is configured to control and monitor the second Christmas tree 118. The third subsea control module 111 is connected to the third Christmas tree 119 through a cable, and is configured to control and monitor the third Christmas tree 119. The fourth subsea control module 112 is connected to the fourth Christmas tree 120 through a cable, and is configured to control and monitor the fourth Christmas tree 120. The fifth subsea control module 113 is connected to the fifth Christmas tree 121 through a cable, and is configured to control and monitor the fifth Christmas tree 121. The sixth subsea control module 114 is connected to the sixth Christmas tree 122 through a cable, and is configured to control and monitor the sixth Christmas tree 122. The seventh subsea control module 115 is connected to the seventh Christmas tree 123 through a cable, and is configured to control and monitor the seventh Christmas tree 123. The eighth subsea control module 116 is connected to the eighth Christmas tree 124 through a cable, and is configured to control and monitor the eighth Christmas tree 124. The first Christmas tree 117 is connected to the first electric submersible pump 127 through a hydraulic pipeline, and is configured to control an oil and gas production circuit of the first electric submersible pump 127. The second Christmas tree 118 is connected to the second electric submersible pump 128 through a hydraulic pipeline, and is configured to control an oil and gas production circuit of the second electric submersible pump 128. The third Christmas tree 119 is connected to the third electric submersible pump 129 through a hydraulic pipeline, and is configured to control an oil and gas production circuit of the third electric submersible pump 129. The fourth Christmas tree 120 is connected to the fourth electric submersible pump 130 through a hydraulic pipeline, and is configured to control an oil and gas production circuit of the fourth electric submersible pump 130. The fifth Christmas tree 121 is connected to the fifth electric submersible pump 131 through a hydraulic pipeline, and is configured to control an oil and gas production circuit of the fifth electric submersible pump 131. The sixth Christmas tree 122 is connected to the sixth electric submersible pump 132 through a hydraulic pipeline, and is configured to control an oil and gas production circuit of the sixth electric submersible pump 132. The seventh Christmas tree 123 is connected to the seventh electric submersible pump 133 through a hydraulic pipeline, and is configured to control an oil and gas production circuit of the seventh electric submersible pump 133. The eighth Christmas tree 124 is connected to the eighth electric submersible pump 134 through a hydraulic pipeline, and is configured to control an oil and gas production circuit of the eighth electric submersible pump 134. The central manifold 125 is connected to the offshore crude oil production device 126 through a hydraulic pipeline, and is configured to transport exploited oil and gas to a water surface. The offshore crude oil production device 126 is located on the water surface, and is configured to store and process the exploited oil and gas. The first electric submersible pump 127, the second electric submersible pump 128, the third electric submersible pump 129, the fourth electric submersible pump 130, the fifth electric submersible pump 131, the sixth electric submersible pump 132, the seventh electric submersible pump 133, and the eighth electric submersible pump 134 are located below the seabed, and are configured to exploit the oil and gas.

Figure 2:
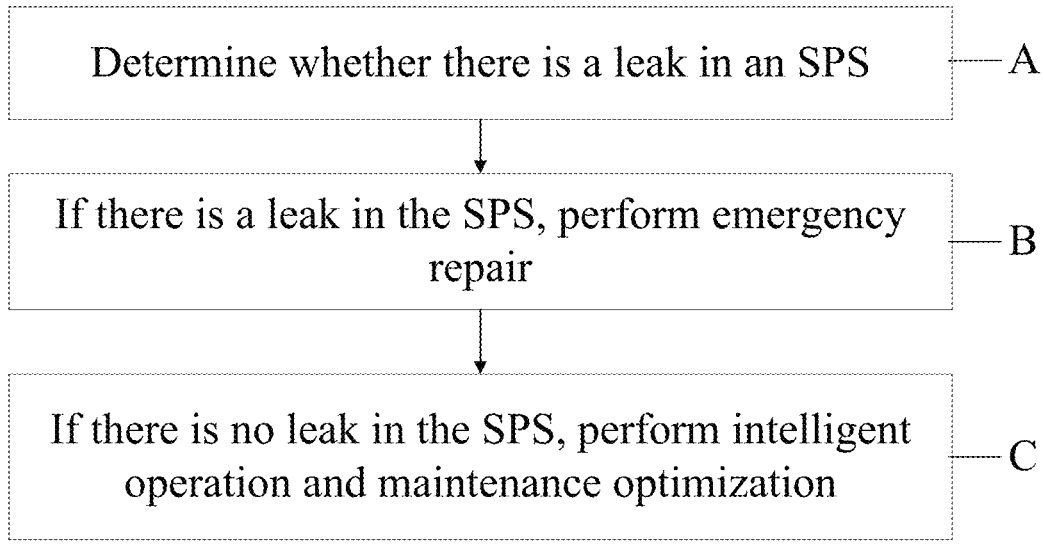
FIG. 2 is a schematic flowchart of an intelligent operation and maintenance optimization method for an offshore oil SPS according to an embodiment of the present disclosure.

As shown in FIG. 2, the operation and maintenance optimization method includes the following steps:

Step A: Determine whether there is a leak in the SPS.

Step B: If there is a leak in the SPS, perform emergency repair.

Step C: If there is no leak in the SPS, perform intelligent operation and maintenance optimization.

Performing emergency repair includes: determining a leak position of the SPS; and immediately repairing the SPS based on the leak position.

Performing intelligent operation and maintenance optimization includes: calculating a static health index of the SPS based on ashore sensor status data and Christmas tree sensor data of the SPS; estimating dynamic health indexes of the SPS at different moments through a Kalman filtering algorithm by using the static health index of the SPS as a dynamic health index at an initial moment; calculating toughness of the SPS under different maintenance strategies based on the dynamic health indexes at different moments; constructing a multi-objective optimization function with optimization objectives of maximizing the toughness and minimizing a maintenance cost of the SPS; solving the multi-objective optimization function through a multi-objective optimization solution algorithm to obtain an optimal maintenance strategy for the SPS; and maintaining the SPS based on the optimal maintenance strategy.

Where maintaining the SPS based on the optimal maintenance strategy includes: according to the optimal maintenance strategy, a remotely operated vehicle (ROV) is released by the vessel for subsea operations support to perform maintenance on the SPS, specifically to repair or maintain the subsea distribution unit, the subsea control module, the Christmas tree, and the electric submersible pump in the SPS.

Determining the leak position of the SPS includes the following steps:

S101: Establish a leak signal propagation velocity model.

S1-1: Establish an internal and external simulation model of a pipeline in a subsea manifold based on an actual working condition of the subsea manifold. A transient flow model of fluid in the pipeline is established based on a physical structure of the subsea production manifold. A manifold system is transformed into a mathematical model, including a geometric shape of the manifold pipeline, a material characteristic of the pipeline, an external condition, and the like. A fluid dynamics equation is used to describe fluid flow in the pipeline and noise outside the pipeline.

S1-2: Calculate a propagation velocity of a pressure wave generated by the leak and an acoustic velocity.

In view of pipeline characteristics, a waveform and propagation velocity of a transient pressure wave in a leaking pipeline are calculated based on changes in a pipeline physical parameter, a physical property of a transmission medium, and an external physical parameter. An average inner diameter of the pipeline is D. A wall thickness of the pipeline is d. A flow area is $\omega$. A liquid density is $\rho$. A bulk modulus is K. A liquid flow velocity is V. An elastic modulus of the pipeline is E. A propagation velocity Aa of a negative pressure wave in the pipeline is determined. Based on conservation of mass, continuity of liquid, compression of liquid, and expansion of a pipeline wall, a mass equation of liquid pouring into a micro-element pipeline section in unit time is established. The equation is established by using a mass change obtained through two calculation methods. After sorting, the following formula for calculating the propagation velocity of the pressure wave can be obtained:

$$A\alpha = \frac{1}{\sqrt{\rho\left(\frac{1}{K} + \frac{D}{\delta E}\right)}}.$$

A correction coefficient of the pipeline is selected based on an actual physical constraint of the subsea production manifold to establish a pressure wave propagation velocity correction model:

$$Aa = \frac{1}{\sqrt{\rho\left(\frac{1}{K} + \frac{D}{\delta E}\left(\frac{1}{1+\frac{\delta}{D}}\left[(1-\mu^2) + 2\frac{\delta}{D}(1+\mu)\left(1+\frac{\delta}{D}\right)\right]\right)\right)}}.$$

μ represents the correction coefficient of the pipeline.

Based on an external environment of the subsea manifold, dependencies of the acoustic velocity on a temperature, salinity, and static pressure in water are established through repeated tests by using an empirical formula, to establish a subsea acoustic velocity model:

$$c(Ps,t_o) = 1402.7 + 488t_o - 482t_o^2 + 135t_o^3 + (15.9 + 2.8t_o + 2.4t_o^2)(Ps/100)$$

$t_o$ represents a temperature coefficient. $t_o = T_o/100$ $T_o$ represents the temperature, in ° C. $0 \leq T_o \leq 100°$ C. Ps represents the static pressure, in bar.

S1-3: Establish a leak identification model based on characteristics of leak signals, and acquire a transient pressure signal and acoustic signal of the leaking pipeline.

S102: Establish a tiny leak signal denoising model.

S2-1: Establish a transient pressure signal denoising model.

A three-layer wavelet packet decomposition model is established for an acquired valid leak pressure signal. During wavelet packet decomposition, an original signal $X_{0,0}$ can be decomposed into a series of $X_{c,d}$ signals, where c represents a scale, namely a number of layers into which a wavelet packet is decomposed, and d represents a number of nodes. In the following formula, c=0, 1, 2, 3, and d=0, 1, 2, 3, 4, 5, 6, 7.

$$X_{0,0} = X_{1,0} + X_{1,1} = X_{2,0} + X_{2,1} + X_{2,2} + X_{2,3} = X_{3,0} + X_{3,1} + X_{3,2} + X_{3,3} + X_{3,4} + X_{3,5} + X_{3,6} + X_{3,7}$$

If the number d of nodes is even, $X_{c,d}$ represents a low-frequency component signal, which is obtained through decomposition with a low-pass filter coefficient g(c). If the number d of nodes is odd, $X_{c,d}$ represents a high-frequency component signal, which is obtained through decomposition with a high-pass filter coefficient h(c). The low-pass and high-pass filter coefficients need to have the following orthogonality relation: $g(c) = (-1)^c h(1-c)$.

Through layer-by-layer calculation, decomposition signals calculated at different decomposition layers are obtained.

In the foregoing decomposition manner, after the signal is decomposed at the $c^{th}$ layer of the wavelet packet, $2^c$ detail component signals are obtained, and each signal matches a corresponding frequency band.

Unscented Kalman filtering denoising is performed based on an unscented Kalman filtering denoising algorithm, which specifically includes the following steps:

Sigma points corresponding to an estimated value are obtained through unscented transformation. A series of sigma points are used to approximate a posterior probability density of a state, to ensure accuracy of the estimated value. The following formulas are unscented transformation equations. The sigma points and their weights are determined through unscented transformation.

An unscented transformation formula is substituted for calculation to obtain the following sigma point matrix of an X column vector at an estimation moment k:

$X_k^0 = \hat{X}_k (d=0)$
$X_k^d = \hat{X}_k + \sqrt{(B+\lambda)P_k} (d=1, 2, \ldots, B)$
$X_k^d = \hat{X}_k - \sqrt{(B+\lambda)P_k} (d=B+1, B+2, \ldots, 2B)$ $X_k^0$ represents a sigma point corresponding to a node 0 at the estimation moment k. $\hat{X}_k$ represents an estimated value of a detail component signal of the node 0 at the estimation moment k. $X_k^d$ represents a sigma point corresponding to a node d at the estimation moment k. $P_k$ represents a covariance matrix at the estimation moment k. $\lambda$ represents a scale parameter. $\lambda = \alpha^2(B+\varphi-B)$. $\alpha$ represents a scale factor. $\beta$ represents prior information used to incorporate a random variable. 2B represents a number of nodes.

The matrix formula is substituted into a system state transition equation to obtain a noiseless signal at a next moment;

$$X_{k+1|k}^d = f(X_k^d)$$

$X_{k+1|k}^d$ represents a prior estimate of the noiseless signal at the node d at an estimation moment k+1. f( ) represents the state transition equation. $X_k^d$ represents the sigma point corresponding to the node d at the estimation moment k.

$X_{k+1|k}^d$ obtained at this time is a state matrix at the estimation moment k+1. A weighted mean and an updated covariance matrix are calculated based on the weights corresponding to the nodes:

$$\hat{X}_{k+1} = \sum_{d=0}^{2B} w_m^d X_{k+1|k}^d$$

$$P_{k+1} = \sum_{d=0}^{2B} w_c^d \left(X_{k+1|k}^d - \hat{X}_{k+1}\right)\left(X_{k+1|k}^d - \hat{X}_{k+1}\right)^T$$

$\hat{X}_{k+1}$ represents an estimated value of the detail component signal at the estimation moment k+1. $w_m^d$ represents a weight of a mean of the node d. $w_c^d$ represents a weight of a variance of the node d. $P_{k+1}$ represents a covariance matrix at the estimation moment k+1. 2B represents the number of nodes.

A new sigma point set is generated by performing unscented transformation again based on the updated state matrix formula. The point set is substituted into the system state transition equation. Unscented transformation is performed twice such that a predicted noise value has system representativeness, to obtain an optimal denoised signal.

Measured values of the new sigma points generated through the foregoing formula are weighted to obtain a predicted mean and covariance.

A Kalman gain coefficient is obtained based on the covariance. The state and covariance matrix of the system are updated through the gain coefficient K, as shown in the following formulas:

$$k_{k+1} = p_{xz} p_{zz}^{-1}$$

$$\hat{X}_{k+1|k+1} = \hat{X}_{k+1|k} + k_{k+1}(Z_{k+1} - \hat{Z}_{k+1})$$

$$p_{k+1|k+1} = p_{k+1|k} - k_{k+1} p_{zz} k_{k+1}$$

$k_{k+1}$ represents a covariance matrix at the estimation moment k+1. $P_{xz}$ represents a covariance matrix of a denoised signal and prior prediction. $P_{zz}$ represents a covariance matrix of the prior prediction. $\hat{X}_{k+1|k}$ represents a prior estimate of the denoised signal at the estimation moment k+1, which is an estimate made by the algorithm based on a result of previous iteration. $P_{k+1|k}$ represents a prior estimate of the covariance at the estimation moment k+1. $Z_{k+1}$ represents the prior prediction at the estimation moment k+1. $\hat{X}_{k+1|k+1}$ represents a posterior estimate of the denoised signal at the estimation moment k+1. $P_{(k+1|k+1)}$ represents a posterior estimate of the covariance at the estimation moment k+1. Updated $\hat{X}_{(k+1|k+1)}$ is output as the optimal denoised signal of the system. $\hat{X}_{k+1|k+1}$ and $P_{k+1|k+1}$ are used as initial values at a next moment to continue iteration and perform circular denoising.

S2-2: Establish a tiny leak acoustic signal denoising model.

Denoising is performed on an acquired acoustic signal through a spectral subtraction method. It is assumed that an acoustic signal $p_a(m)$ in pure water and noise $n_a(m)$ are $s_a(m)$. The noise $n_a(m)$ is additive noise unrelated to the acoustic signal $p_a(m)$ in the pure water. The following signal is obtained:

$$s_a(m) = p_a(m) + n_a(m)$$

Windowing and framing are performed on $s_a(m)$ to obtain a subsea noise sub-signal.

Fourier transform is performed on the subsea noise sub-signal to obtain the subsea noise sub-signal after Fourier transform.

An amplitude, a phase angle, and a power spectrum of each component are calculated.

If there is no leak, noise, namely $n_a(m)$, exists. F represents a number of frames corresponding to the noise. Average energy of the noise is as follows:

$$E_a(k) = \sum_{f=1}^{F} |N_{af}(k)|^2 / F$$

$E_a(k)$ represents average energy of the noise at the estimation moment k. $N_{af}(k)$ represents a noise sub-signal of the $f^{th}$ frame after Fourier transform at the estimation moment k. A subsea acoustic signal is calculated as follows:

$$|\hat{P}_{af}(k)|^2 = \begin{cases} |S_{af}(k)|^2 - \alpha' E_a(k) & |S_{af}(k)|^2 \geq \alpha' E_a(k) \\ \beta' |S_{af}(k)|^2 & |S_{af}(k)|^2 < \alpha' E_a(k) \end{cases}$$

$\hat{P}_{af}(k)$ represents the calculated subsea acoustic signal. $S_{af}(k)$ represents the subsea noise sub-signal of the $f^{th}$ frame after Fourier transform at the estimation moment k. $\alpha$ represents an over-subtraction factor, $\alpha' \geq 1$. $\beta'$ represents a gain compensation factor. $\beta' \in (0,1)$.

S103: Establish a leak positioning model.

A tiny leak positioning method for a subsea manifold is based on pressure wave reflection and a sound arrival time difference.

For a tiny leak, a single signal recognition method has some shortcomings in anti-interference. A correlation algorithm is used to determine whether leak noise and pressure drop occur simultaneously. It is assumed that a signal measured by an acoustic wave sensor is $p_a(t')$ and a signal measured by a pressure sensor is $X(t')$. They can be expressed as a sum of time-averaged and fluctuating values.

$$p_a(t') = \bar{p}(t') + p(t')$$

$$X(t') = \bar{a}(t') + a(t')$$

$\bar{p}(t')$ and $p(t')$ respectively represent time-averaged and fluctuating signals of an acoustic wave. $\bar{a}(t')$ and $a(t')$ respectively represent time-averaged and fluctuating signals of a pressure wave. t' represents a sampling moment.

Correlation calculation is performed on the fluctuating values of $p_a(t')$ and $X(t')$ $$R_{AP} = \lim_{T \to \infty} \frac{1}{2T} \int_{-T}^{T} |P_a(t') - \bar{p}(t')| \Box |\nabla(X(t') - \bar{a}(t'))| \Box dt'$$

$R_{AP}$ represents a correlation function of the fluctuating signal. 2T represents a total number of sampling moments.

Considering that a discrete signal is acquired by the sensor in a time interval $\Delta t$, a sampling frequency is $f_s$, and N represents a number of samples in the time interval $\Delta t$, the foregoing formula can be converted into:

$$R_{AP} = \frac{1}{N} \sum_{n=1}^{N} |p_n(t')| \Box |\nabla a_n(t')|$$

$$N = \Box t / f_s$$

The correlation function $R_{AP}(\Delta t)$ indicates a product of fluctuation or variation values of the two signals in the time interval $\Delta t$, and is used to determine whether the pressure wave and acoustic wave for the leak are generated simultaneously. If no, a theoretical value of $R_{AP}(\Delta t)$ is 0. Under leak-free conditions, an actual value of $R_{AP}(\Delta t)$ is not 0 due to background noise and pressure fluctuations. However, an acoustic intensity and a pressure fluctuation in the pipeline are small. A threshold $|R_{AP}|$ is specified. The value of $|R_{AP}|$ can be determined experimentally and through expert experience. If $R_{AP}(\Delta t) > |R_{AP}|$, it can be determined that there is a tiny leak and a start moment of the leak can be accurately identified.

A fluid flow velocity and a distance between an upstream sensor A and a downstream sensor B on the leaking pipeline are measured based on the propagation velocity of the pressure wave for the leak in the subsea production manifold. A time difference between moments at which the upstream and downstream sensors receive the pressure wave generated at the leak position is selected based on the optimal denoised signal, to establish the following leak positioning model:

$$X_{d1} = \frac{1}{2\alpha} [L(\alpha - vd) + \Delta t_{12}(\alpha^2 - vd^2)]$$

$X_{d1}$ represents a distance between the leak position and an upstream detection position. α represents a propagation velocity of a target wave. L represents a distance between the upstream detection position and a downstream detection position. $v_d$ represents a flow velocity of fluid in the leaking pipeline. $\Delta t_{12}$ represents a time difference between a moment at which a target wave signal generated at the leak position is detected at the upstream detection position and a moment at which the target wave signal generated at the leak position is detected at the downstream detection position.

A hydrophone array is determined. A hydrophone $H_1$ is selected as a reference. A law of acoustic pressure variation with a distance and a depth is studied. A moment $t_1$ at which the reference hydrophone detects a leak is identified through a single-parameter double-threshold leak detection method. Two thresholds of each of the other hydrophones are determined based on the hydrophone array and the law of acoustic pressure variation. Leak occurrence moments $t_2$, $t_3$, and $t_4$ are identified. Differences are made with the reference hydrophone to obtain time differences $\tau_{12}$, $\tau_{13}$, and $\tau_{14}$. Positioning is performed based on the propagation velocity c of the acoustic signal for the leak in the subsea production manifold.

Positioning results are obtained based on pressure wave reflection and an acoustic wave arrival time difference, to accurately obtain the position of the leak in the subsea production manifold and reduce a positioning error.

Calculating the static health index of the SPS based on the ashore sensor status data and the Christmas tree sensor data of the SPS includes:

Step A1: Obtain the ashore sensor status data and the Christmas tree sensor data of the SPS, which specifically includes the following step:

S201: Obtain a status of a fault symptom layer of the SPS through signal processing.

Statuses of fault symptom layers $S_1$, $S_2$, . . . , $S_b$, $C_1$, $C_2$, . . . , and $C_c$ of the SPS are obtained through signal processing. The corresponding statuses are $S_1(s_1)$, $S_2(s_2)$, . . . , $S_b(s_b)$, $C_1(c_1)$, $C_2(c_2)$, . . . , and $C_c(c_c)$. $S_1$, $S_2$, . . . , and $S_b$ represent statuses of ashore sensors of the SPS, which are obtained from the workstation 103. $C_1$, $C_2$, . . . , and $C_c$ represent data of Christmas tree sensors of the SPS, which are obtained from the workstation 103.

Step A2: Calculate a fault probability of each component of the SPS based on the ashore sensor status data and the Christmas tree sensor data, which specifically includes the following steps:

S202: Calculate the fault probability of each maritime component of the SPS.

The fault probability of each maritime component of the SPS is calculated based on a Bayesian network shown in FIG. 2. For the maritime component $U_x$ (x=1, 2, . . . , I1), a fault probability solution method is as follows:

$$P(U_x|S_1(s_1), S_2(s_2), \ldots, S_b(s_b)) = \frac{P(S_1(s_1), S_2(s_2), \ldots, S_b(s_b)|U_x)P(U_x)}{P(S_1(s_1))P(S_2(s_2)) \ldots R(S_b(s_b))}$$

$P(U_x|S_1(s_1), S_2(s_2), \ldots, S_p(s_p))$ represents a fault probability of the maritime component $U_x$ if statuses of $1^{st}$, $2^{nd}$, . . . , and $b^{th}$ ashore sensors of the SPS are $S_1(s_1)$, $S_2(s_2)$, . . . , and $S_b(s_b)$, which is calculated by using the formula. $S_1(s)$ $S_2(s_2)$, and sp ($s_p$) represent the statuses of the $1^{st}$, $2^{nd}$, and $b^{th}$ ashore sensors, and b represents a number of ashore sensors. $P(S_1(s_1), S_2(s_2), \ldots, S_b(s_b)|U_x)$ represents a probability that the statuses of the $1^{st}$, $2^{nd}$, . . . , and $b^{th}$ ashore sensors of the SPS are $S_1(s_1)$, $S_2(s_2)$, . . . , and $S_b(s_b)$ if the maritime component Ur is faulty, which is obtained through expert decision making. $P(U_x)$ represents the fault probability of the maritime component $U_x$, which is obtained through expert decision making. $P(S_1(s_1))$ represents a probability that the status of the $1^{st}$ ashore sensor of the SPS is $S_1(s_1)$, $P(S_2(s_2))$ represents a probability that the status of the $2^{nd}$ ashore sensor of the SPS is $S_2(s_2)$, and $P(S_b(s_b))$ represents a probability that the status of the $b^{th}$ ashore sensor of the SPS is $S_b(s_b)$, which are obtained through expert decision making.

S203: Determine a fault status of each maritime component of the SPS. If $P(U_x|S_1(s_1), S_2(s_2), \ldots, S_b(s_b)) >= 75\%$, the corresponding component is considered faulty.

S204: Calculate the fault probability of each Christmas tree component of the SPS. For a Christmas tree component $T_x$, a fault probability solution method is as follows:

$$P(T_x|C_1(c_1), C_2(c_2), \ldots, C_c(c_c)) = \frac{P(C_1(c_1), C_2(c_2), \ldots, C_c(c_c)|T_x)P(T_x)}{P(C_1(c_1))P(C_2(c_2)) \ldots R(C_C(c_C))}$$

$P(T_x|C_1(c_1), C_2(c_2), \ldots, C_c(c_c))$ represents a fault probability of the Christmas tree component $T_x$ if statuses of $1^{st}$, $2^{nd}$, . . . , and $c^{th}$ Christmas tree sensors of the SPS are $C_1(c_1)$, $C_2(c_2)$, . . . , and $C_c(c_c)$, which is calculated by using the formula. $P(C_1(c_1), C_2(c_2), \ldots, C_c(c_c)|T_x)$ represents a probability that the statuses of the $1^{st}$, $2^{nd}$, . . . , and $c^{th}$ Christmas tree sensors of the SPS are $C_1(c_1)$, $C_2(c_2)$, . . . , and $C_c(c_c)$ if the Christmas tree component $T_x$ is faulty, which is obtained through expert decision making. $P(T_x)$ represents a fault probability of the Christmas tree component $T_x$, which is obtained through expert decision making. $P(C_1(c_1))$ represents a probability that the status of the $1^{st}$ Christmas tree sensor of the SPS is $C_1(c_1)$, $P(C_2(c_2))$ represents a probability that the status of the $2^{nd}$ Christmas tree sensor of the SPS is $C_2(c_2)$, and $P(C_c(c_c))$ represents a probability that the status of the $c^{th}$ Christmas tree sensor of the SPS is $C_c(c_c)$, which are obtained through expert decision making.

S205: Determine a fault status of each Christmas tree component of the SPS. If $P(T_x|C_1(c_1), C_2(c_2), \ldots, C_c(c_c)) >= 75\%$, the corresponding Christmas tree component is considered faulty.

S206: Obtain and input the fault status of each maritime component of the SPS into a digital twin model to output a result.

S207: Record pressure $p_i$ of a hydraulic circuit behind the maritime component at each position, compare the calculated pressure p; with actually read pressure $rp_i$, and calculate an error.

The pressure $p_i$ of the hydraulic circuit behind the maritime component at each position is recorded based on the calculation result in S206. The calculated pressure $p_i$ is compared with the actually read pressure $rp_i$, and the error is calculated by using a diagnosis result error calculation formula.

S208: Generate feedback information based on the calculated error of the maritime component. The feedback information is generated in the following manner:

If $E_u < 15\%$, it is considered that the fault statuses of the maritime components obtained in $S_{203}$ are all accurate, and a fault diagnosis result is output.

Figure 3:
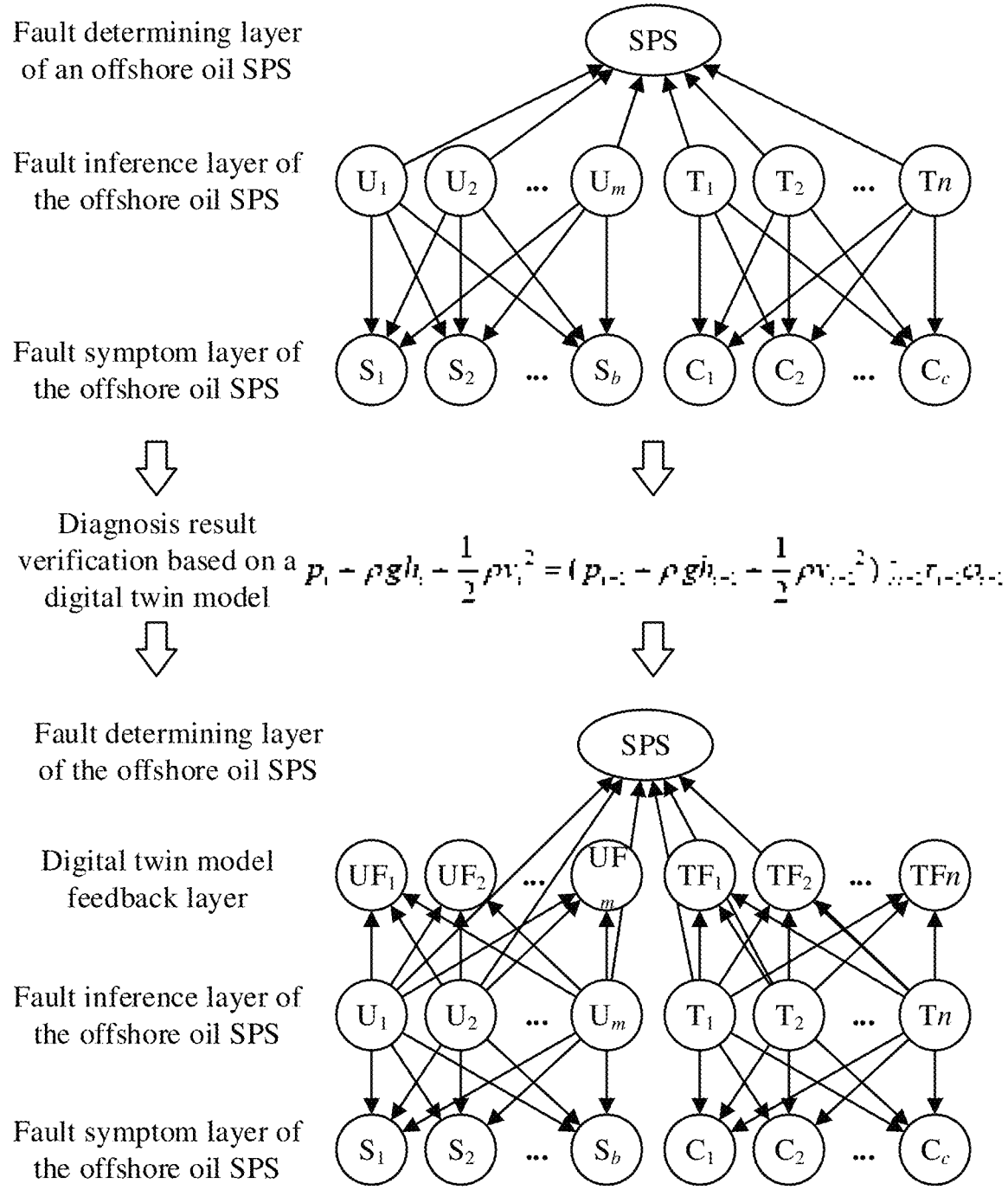
FIG. 3 is a principle diagram of a fault diagnosis method for an SPS according to an embodiment of the present disclosure.

Otherwise, a UF node corresponding to the faulty component determined in S203 is set to normal (FIG. 3), and the other nodes are set to unknown.

S209: Rediagnose the fault status of each maritime component.

The fault status of each maritime component is rediagnosed based on the feedback information in S208. A diagnosis method is as follows:

$$P(U_x|S_1(s_1), S_2(s_2), \ldots, S_b(s_b),$$

$$UF_1(U/N), UF_2(U/N), \ldots, UF_{f1}(U/N)) =$$

$$\frac{P(S_1(s_1), S_2(s_2), \ldots, S_b(s_b), UF_1(U/N), UF_2(U/N), \ldots, UF_{f1}(U/N)|U_x)P(U_x)}{P(S_1(s_1))P(S_2(s_2)) \ldots R(S_b(s_b))}$$

$P(U_x|S_1(s_1), S_2(s_2), \ldots, S_b(s_b), UF_1(U/N), UF_2(U/N), \ldots, UF_{f1}(U/N))$ represents a fault probability of a maritime component $U_x$ if statuses of $1^{st}$, $2^{nd}$, ..., and $b^{th}$ ashore sensors of the SPS are $S_1(s_1)$, $S_2(s_2)$, ..., and $S_b(s_b)$ and feedback information is $UF_1(U/N)$, $UF_2(U/N)$, ..., and $UF_{f1}(U/N)$, which is calculated by using the formula. (U/N) represents normal (N) and unknown (U) in the feedback information. The information is updated in $S_{208}$. $P(S_1(s_1), S_2(s_2), \ldots, S_b(s_b), UF_1(U/N), UF_2(U/N), \ldots, UF_{f1}(U/N)|U_x)$ represents a probability that the statuses of the $1^{st}$, $2^{nd}$, ..., and $b^{th}$ ashore sensors of the SPS are $S_1(s_1)$, $S_2(s_2)$, ..., and $S_b(s_b)$ and the feedback information is $UF_1(U/N)$, $UF_2(U/N)$, ..., and UF/(U/N) if the maritime component $U_x$ is faulty, which is obtained through expert decision making. $P(U_x)$ represents a fault probability of the maritime component $U_x$, which is obtained through expert decision making. $P(S_1(s_1))$ represents a probability that the status of the $1^{st}$ ashore sensor of the SPS is $S_1(s_1)$, $P(S_2(s_2))$ represents a probability that the status of the $2^{nd}$ ashore sensor of the SPS is $S_2(s_2)$, and $P(S_b(s_b))$ represents a probability that the status of the $b^{th}$ ashore sensor of the SPS is $S_b(s_b)$. I1 represents a number of maritime components in a maritime component set, which is obtained through expert decision making.

S210: Determine the fault status of each maritime component of the SPS. If $P(U_x|S_1(s_1), S_2(s_2), \ldots, S_b(s_b), UF_1(U/N), UF_2(U/N), \ldots, UF_{f1}(U/N)) >= 75\%$, the corresponding component is considered faulty.

S211: Obtain and input the fault status of each Christmas tree component of the SPS into a digital twin model to output a result.

In S206 and S211, a digital twin model result output formula is as follows:

$$p_i + \rho g h_i + \frac{1}{2}\rho v_i^2 = \left(p_{i-1} + \rho g h_{i-1} + \frac{1}{2}\rho v_{i-1}^2\right)\zeta_{i-1}\tau_{i-1}\varphi_{i-1}$$

$p_i$ represents pressure of a hydraulic circuit behind an $i^{th}$ target component output by the digital twin model. $\rho$ represents a fluid density of a hydraulic circuit in which the target component is located, which is obtained by consulting a system manual. g represents an acceleration of gravity, which is 9.8 m/s². $h_i$ represents a height of the hydraulic circuit behind the $i^{th}$ target component, which is obtained through actual measurement. $v_i$ represents a flow velocity of fluid behind the $i^{th}$ target component, which is obtained by reading a flowmeter. $p_{i-1}$ represents pressure of a hydraulic circuit in front of the $i^{th}$ target component, which is obtained through iterative calculation. Initial data is obtained by reading inlet pressure. $h_{i-1}$ represents a height of the hydraulic circuit in front of the $i^{th}$ target component, which is obtained through actual measurement. $v_{i-1}$ represents a flow velocity of fluid in front of the $i^{th}$ target component. $\tau_{i-1}$ represents a control parameter in front of the $i^{th}$ target component. $\zeta_{i-1}$ represents a loss parameter in front of the $i^{th}$ target component, which is obtained by averaging historical data. $\varphi_{i-1}$ represents a fault parameter of the $i^{th}$ target component. A value of the fault parameter is 0 if the $i^{th}$ target component is considered faulty, and 1 otherwise.

S212: Record pressure of a hydraulic circuit behind the Christmas tree component at each position, compare the calculated pressure with actually read pressure, and calculate an error by using the diagnosis result error calculation formula.

In S207 and S212, the diagnosis result error calculation formula is as follows:

$$E_u = \frac{\sum_{i=1}^{I} \frac{|p_i - rp_i|}{rp_i}}{I} \times 100\%$$

$E_u$ represents the diagnosis result error of the target component set. $p_i$ represents the pressure of the hydraulic circuit behind the $i^{th}$ target component output by the digital twin model. $rp_i$ represents the actually read pressure of the hydraulic circuit behind the $i^{th}$ target component. I represents a number of target components in the target component set.

S213: Generate feedback information based on the calculated error of the Christmas tree component. The feedback information is generated in the following manner:

If $E_u < 15\%$, it is considered that the fault statuses of the Christmas tree components obtained in S205 are all accurate, and a fault diagnosis result is output.

Otherwise, a TF node corresponding to the faulty component determined in S205 is set to normal (FIG. 3), and the other nodes are set to unknown.

S214: Rediagnose the fault status of each Christmas tree component of the SPS.

The fault status of each Christmas tree component of the SPS is rediagnosed based on the feedback information in S213. A diagnosis method is as follows:

$$P(T_x|C_1(c_1), C_2(c_2), \ldots, C_c(c_c), TF_1(U/N), TF_2(U/N), \ldots, TF_n(U/N)) =$$

$$\frac{P(C_1(c_1), C_2(c_2), \ldots, C_c(c_c), TF_1(U/N), TF_2(U/N), \ldots, TF_n(U/N)|T_x)P(T_x)}{P(C_1(c_1))P(C_2(c_2))\ldots P(C_c(c_c))}$$

$P(T_x|C_1(c_1), C_2(c_2), \ldots, C_c(c_c), TF_1(U/N), TF_2(U/N), \ldots, TF_n(U/N))$ represents a fault probability of a Christmas tree component $T_x$ if statuses of Christmas tree sensors of the SPS are known to be $C_1(c_1), C_2(c_2), \ldots,$ and $C_c(c_c)$ and feedback information is $TF_1(U/N), TF_2(U/N), \ldots,$ and $TF_n(U/N)$, which is calculated by using the formula. (U/N) represents normal (N) and unknown (U) in the feedback information. The information is updated in S213. $P(C_1(c_1), C_2(c_2), \ldots, C. (c_c), TF_1(U/N), TF_2(U/N), \ldots, TF_n(U/N)|T_x)$ represents a probability that the statuses of the Christmas tree sensors of the SPS are $C_1(c_1), C_2(c_2), \ldots,$ and C. $(c_c)$ and the feedback information is $TF_1(U/N), TF_2(U/N), \ldots,$ and $TF_n(U/N)$ if the Christmas tree component $T_x$ is faulty, which is obtained through expert decision making. $P(T_x)$ represents a fault probability of the Christmas tree component $T_x$, which is obtained through expert decision making. $P(C_1(c_1)), P(C_2(c_2)), \ldots,$ and $P(C_c(c_c))$ respectively represent probabilities that the Christmas tree sensors of the SPS are $C_1(c_1), C_2(c_2), \ldots,$ and $C_c(c_c)$, which is obtained through expert decision making.

S215: Determine the fault status of each Christmas tree component of the offshore oil SPS. If $P(T_x|C_1(c_1), C_2(c_2), \ldots, C_c(c_c), TF_1(U/N), TF_2(U/N), \ldots, TF_n(U/N)) \geq 75\%$, the corresponding Christmas tree component is considered faulty.

S216: Repeat S206 to S215 until the fault statuses of all components are output.

S217: Determine a fault status of the SPS. If any maritime component or Christmas tree component of the SPS is determined to be faulty, the SPS is considered faulty, otherwise the SPS is not faulty.

Step A3: Predict the static health index of the SPS based on the fault probability of each component of the SPS, which specifically includes the following steps:

S301: Analyze sensitivities of modules. Historical monitoring data of the modules of the SPS is extracted from the workstation 103. Degradation rate parameters of the modules are estimated. Reliability models of the modules are constructed through an exponential degradation model. Dependencies and connections between the modules, and complexity of overall operation of the system are analyzed. An overall reliability model of the system is constructed by connecting the models in series. Sensitivities se1, se2, ..., and seJ of J components to overall reliability are calculated.

Reliability of each module may be expressed as follows:

$$Rl_j = e^{-fr_j t}$$

$Rl_j$ represents reliability of the $j^{th}$ component, $fr_j$ represents a degradation rate of the $j^{th}$ component, and t represent a time.

The overall reliability of the SPS may be expressed as follows:

$$R_l = Rl_1 Rl_2 \ldots Rl_J$$

Rl represents the overall reliability of the SPS. $Rl_1, Rl_2,$ and $Rl_j$ respectively represent the reliability of the $1^{st}, 2^{nd},$ and $J^{th}$ components.

S302: Construct the health index of the SPS. A distribution index of each module is calculated based on the sensitivity of each module of the SPS. Online monitoring data of each module of the SPS is extracted from the workstation 103, and performance of each component is calculated. The health index of the SPS is calculated based on the distribution index, performance, and fault probability of each module.

The distribution index of each component is calculated by using the following formula:

$$\xi_j = \frac{se_j}{\sum_{j'=1}^{J} se_{j'}}$$

$\xi_j$ represents the distribution index of the $j^{th}$ component. $se_j$ and $se_{j'}$ respectively represent the sensitivities of the $j^{th}$ and $j'^{th}$ components to the overall reliability of the SPS. J represents a number of components in the SPS.

$$\sum_{j'=1}^{J} se_{j'}$$

represents a sum of the sensitivities of the $1^{st}$ to $J^{th}$ components.

Monitoring data of each module is extracted, and performance of each component is calculated.

$$p_j = \frac{\sum_{n=1}^{N} mon_n}{N \times best_j}$$

$p_j$ represents the performance of the $j^{th}$ component of the SPS. $mon_n$ represents a value of an $n^{th}$ monitoring point of the $j^{th}$ component. N represents a number of monitoring points of the $j^{th}$ component. $best_j$ represents an optimal state of the $j^{th}$ component.

The static health index is calculated:

$$HI = \begin{bmatrix} (1-d_1)p_1 \\ (1-d_2)p_2 \\ \vdots \\ (1-d_J)p_J \end{bmatrix} \times \begin{bmatrix} \xi_1 \\ \xi_2 \\ \vdots \\ \xi_J \end{bmatrix}$$

HI represents the static health index of the SPS. $d_1, d_2,$ and $d_j$ respectively represent the fault probabilities of the $1^{st}, 2^{nd},$ and $J^{th}$ components of the SPS. $p_1, p_2,$ and $p_j$ respectively represent performance of the $1^{st}, 2^{nd},$ and $J^{th}$ components of the SPS. $\xi_1, \xi_2,$ and $\xi_j$, respectively represent the distribution indexes of the $1^{st}, 2^{nd},$ and $J^{th}$ components of the SPS. J represents a number of components in the SPS.

Figure 4:
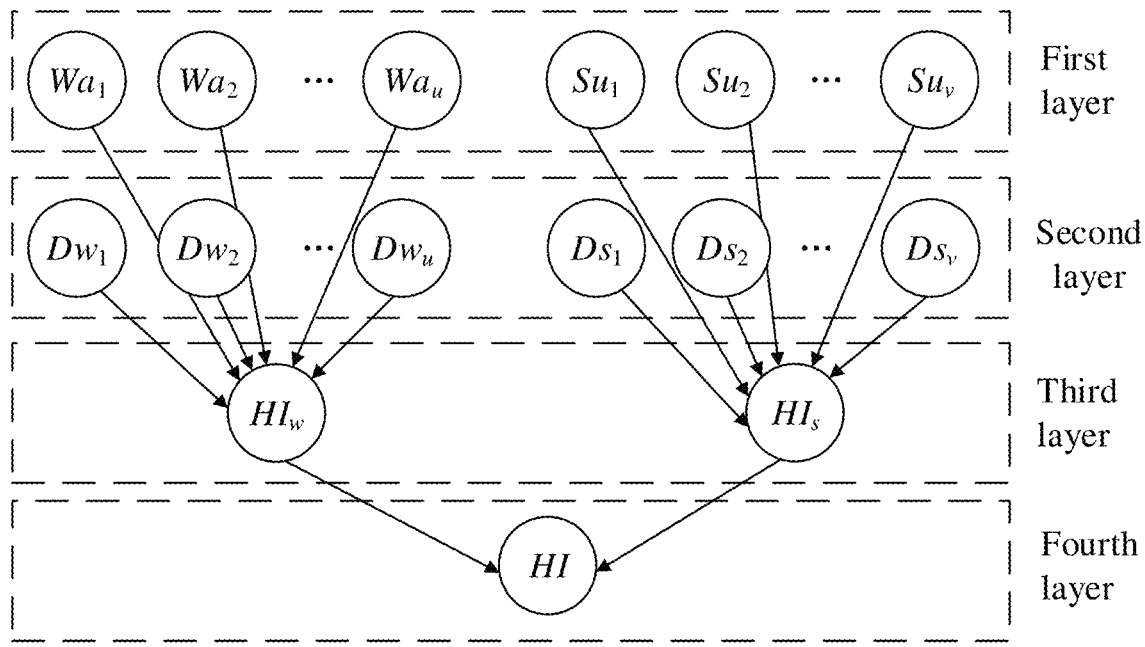
FIG. 4 is a schematic structural diagram of a Bayesian network model for evaluating a static health index according to an embodiment of the present disclosure.

Estimating the dynamic health indexes of the SPS at different moments through the Kalman filtering algorithm by using the static health index of the SPS as the dynamic health index at the initial moment includes:

A1: Construct a Bayesian network model for evaluating the static health index of the SPS, as shown in FIG. 4. The Bayesian network model includes three layers of nodes. Nodes at the first layer are information monitoring nodes. Nodes $Wa_1, Wa_2, \ldots,$ and Wax represent u maritime modules in the SPS. Nodes $Su_1, Su_2, \ldots,$ and $Su_v$ represent v subsea modules in the SPS. Nodes at a correction layer are failure rate nodes. Nodes $Dw_1, Dw_2, \ldots,$ and $Dw_u$ represent failure rates of the u maritime modules in the SPS. Nodes $Ds_1, Ds_2, \ldots,$ and $Ds_v$ represent failure rates of the v subsea modules in the SPS. Nodes at the third layer are intermediate nodes. A node $HI_w$ represents a health index of the maritime modules in the SPS. A node $HI_s$ represents a health index of the subsea modules in the SPS. A node at the fourth layer is a result node. A node HI represents the health index of the SPS.

A2: Dynamically expand the Bayesian network model for evaluating the static health index of the SPS. An SPS dynamic health index calculation model is constructed.

$$HI_{t+1} = HI_t \times e^{-Bzt}$$

$HI_{t+1}$ represents a dynamic health index at a moment t+1. $HI_t$ represents a dynamic health index at a moment t. Bz represents a correction constant.

The dynamic health index is optimally estimated through the Kalman filtering algorithm. A health index state update is described below.

$$\widehat{HI}_t^- = Fk_t \widehat{HI}_{t-1} + Bk_t uk_t$$

$\widehat{HI}_t^-$ represents a prior estimate of the health index at the moment t. $Fk_t$ represents a state transition matrix at the moment t. $\widehat{HI}_{t-1}$ represents a health index estimate at a moment t−1. $Bk_t$ represents a control input matrix at the moment t. $uk_t$ represents control input at the moment t.

A covariance matrix of Kalman filtering may be expressed as $$Pk_t^- = Fk_t Pk_{t-1} Fk_t^T + Qk_t$$

$Pk_t^-$ represents a prior estimate of the covariance matrix at the moment t. $Pk_{t-1}$ represents the covariance matrix at the moment t−1. $Qk_t$ represents noise of a prediction model at the moment t.

Uncertainty results of the dynamically expanded Bayesian network model for evaluating the static health index of the SPS are analyzed to obtain a standard deviation of calculation results, which is transformed into observed noise. In addition, a mean of the calculation results is transformed into an observed value. An observation equation during Kalman filtering update may be expressed as $Z_{DBNt} = Hk_t HI_t + \xi k$.

$Z_{DBNt}$ represents observation information at the moment t obtained based on the dynamically expanded model. $Hk_t$ represents a transition matrix at the moment t. $\xi k$ represents the observed noise.

A Kalman gain is a weighted matrix of intermediate results of residual and filtering calculation and may be expressed as $Kk_t = Pk_t^- Hk_t^T [Rk_t + Hk_t Pk_t^- Hk_t^T]^{-1}$.

$Kk_t$ represents a Kalman gain at the moment t. $Rk_t$ represents an observed noise matrix at the moment t.

A health index state update model may be expressed as $$\widehat{HI}_t = \widehat{HI}_t^- + Kk_t(z_{DBNt} - Hk_t \widehat{HI}_t^-)$$

$\widehat{HI}_t$ represents a health index estimate at the moment t.

A covariance update equation may be expressed as $Pk_t = Pk_t^- - Kk_t Hk_t Pk_t^-$.

$Pk_t$ represents the covariance matrix at the moment t.

Calculating the toughness of the SPS under different maintenance strategies based on the dynamic health indexes at different moments includes:

S401: Construct a failure threshold of the SPS. A critical state of monitoring data of each module of the SPS is evaluated based on expert experience. A failure threshold of each module is calculated by using a critical state value and an optimal state value. The failure threshold of the SPS is calculated based on the distribution index and failure threshold of each module.

The failure threshold of each module is calculated:

$$pf_j = \frac{ft_j}{\text{best}_j}.$$

$pf_j$ represents the failure threshold of the $j^{th}$ component of the SPS. $ft_j$ represents a critical state in which the $j^{th}$ component fails, and $\text{best}_j$ represents an optimal state of the $j^{th}$ component.

The failure threshold of the SPS is calculated:

$$Ft = \begin{bmatrix} pf_1 \\ pf_2 \\ \vdots \\ pf_J \end{bmatrix}^T \times \begin{bmatrix} \xi_1 \\ \xi_2 \\ \vdots \\ \xi_J \end{bmatrix}.$$

Ft represents the failure threshold of the SPS. $pf_1$, $pf_2$, and $pf_J$ respectively represent failure thresholds of the $1^{st}$, $2^{nd}$, and $J^{th}$ components of the SPS.

S402: Calculate a remaining useful life. The remaining useful life of the SPS is duration after which the health index of the system reaches the failure threshold for the first time, which may be expressed as $RUL_0 = \inf\{t: HI(t) \leq Ft | HI(0) > Ft\}$. $RUL_0$ represents an initial remaining useful life of the SPS. HI(t) represents the dynamic health index of the SPS at the moment t. Ft represents the failure threshold of the SPS. HI(0) represents the dynamic health index of the SPS at the initial moment, which is equal to the static health index of the SPS.

S403: Establish a random shock model. In addition to normal degradation, the SPS is affected by some external environmental factors to varying degrees. For example, the SPS is located in a complex seabed environment and suffers from shocks such as internal wave current and typhoon. Cumulative impact of natural disasters on subsea facilities is described through a cumulative shock model. A number of external shocks occurring in a time interval depends only on a length of the time interval, and external shocks are random and independent. Therefore, arrival of an external shock is simulated as a homogeneous Poisson process whose intensity follows a normal distribution. Parameter estimation is performed based on statistical data such as actual water level data in an oilfield sea area, main extreme value data of wind wave current, extreme value data of a wind wave current condition, and extreme value data of internal wave current, to reflect an actual shock process.

S404: Calculate a corrected remaining useful life of the system. Considering impact of an external shock, the health index of the system at the moment t is corrected. The health index of the system at the moment t consists of two parts: an original health index for normal degradation of the system at the moment t and an additional health index due to the external shock at the moment t. The corrected health index of the device at the moment t is $MHI(t) = HI(t) + E_{HI}(t)$. MHI(t) represents a corrected dynamic health index of the SPS at the moment t. $E_{HI}(t)$ represents the additional health index due to the shock at the moment t. MHI(0) represents a corrected static health index.

The corrected remaining useful life of the SPS after the shock, namely a corrected remaining useful life $RUL_1$ of the SPS at a moment $T_s$ is $RUL_1 = \inf\{t: MHI(t) \leq Ft | MHI(0) > Ft\}$. $T_s$ represents a moment at which the shock arrives.

S405: Evaluate the toughness of the system. The remaining useful life is used as a toughness evaluation indicator such that long-term performance and availability of the system can be more comprehensively considered. This helps formulate a more effective maintenance and management strategy and improve the toughness of the system. The remaining useful life provides a prediction of future performance of the system, facilitates formulation of a specific operation and maintenance strategy, and helps quantitatively evaluate and improve a recovery capability of the system.

Figure 5:
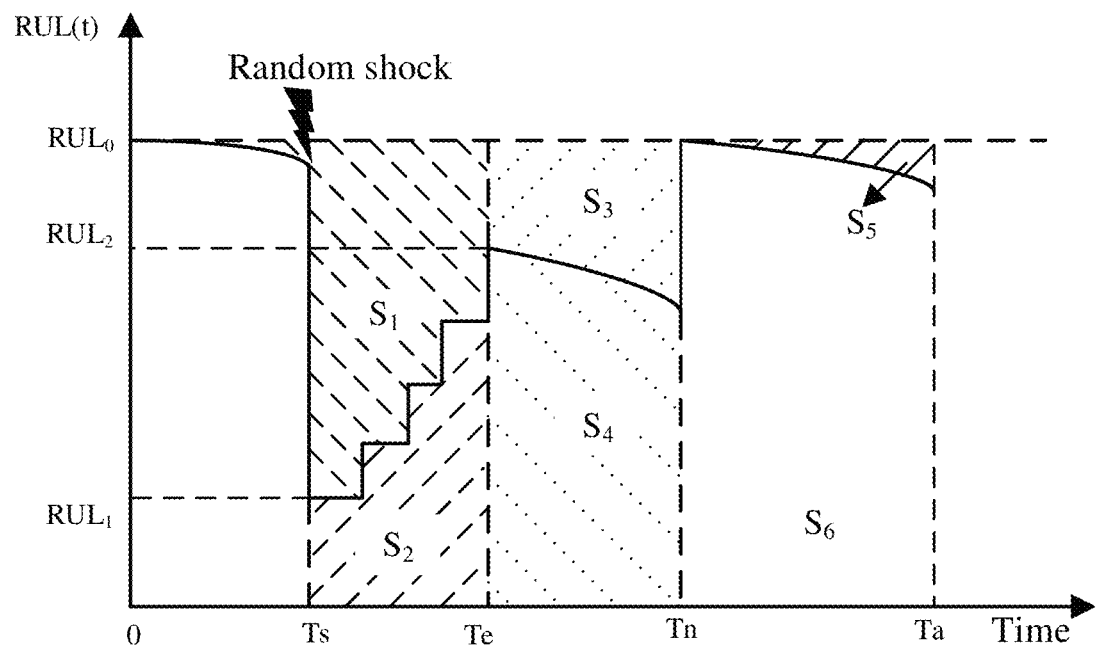
FIG. 5 is a schematic diagram of a change in a remaining useful life of a system in an entire service life cycle according to an embodiment of the present disclosure.

FIG. 5 shows a change in the remaining useful life of the system in an entire service life cycle. An operation cycle of the system is 0 to Ta. During normal operation of the system, the remaining useful life gradually decreases. At a moment Ts, the remaining useful life of the system instantaneously decreases to $RUL_1$ due to impact of an external shock. If this value exceeds a repair threshold, emergency repair is performed immediately. For example, emergency repair is performed on the central manifold. Leak positioning information can provide a basis for decision-making of emergency repair on the central manifold. For many systems, especially distributed systems, a plurality of components are geographically dispersed. Limited maintenance resources make it difficult to simultaneously recover all components. In this case, a stepwise performance recovery curve is closer to reality. At a moment Te, the performance of the system gradually recovers to $RUL_2$. Emergency repair cannot recover the performance of the system to a state before the shock, but can be understood as an imperfect maintenance method. After imperfect maintenance, a degradation amount and degradation rate of the device change. A discount factor is introduced to represent a performance level after emergency repair. $c_k$ is used to represent a maintenance discount factor, namely a remaining useful life discount factor of the system after a $k_c^{th}$ emergency repair. Its probability density function $f(c_k)$ is as follows:

$$f(c_k) = \frac{1/(1-\exp(-Ga \times Gb^{k_e-1})) * Ga \times Gb^{k_e-1}}{T_{EM}/T_{total}} \exp\left(\frac{-Gb^{k_e-1}Ga(T_{EM}/T_{total} - c_k)}{T_{EM}/T_{total}}\right)$$

Ga and Gb are hyperparameters. $T_{EM}$ represents an emergency repair threshold. $T_{total}$ represents a length of the entire service life cycle.

A corrected remaining useful life of the system after repair, namely a corrected remaining useful life $RUL_2$ of the SPS at a moment $T_e$ is $RUL_2=RUL_0*(1-c_k)$. $T_e$ represents a moment at which the SPS is repaired and recovered.

Subsequently, the remaining useful life of the system continues to degrade. If no random shock occurs, the remaining useful life of the system is repaired as new when it degrades to a condition-based maintenance threshold. This improves the system's capability to resist external shocks that will arrive in the future. The impact of the external shock on the system may be quantified as performance loss in a time period from $T_s$ to $T_e$. The toughness of the system may be obtained by calculating an area ratio of a performance curve. The toughness of the system may be expressed as $$Re = \frac{\int_{T_s}^{T_e} RUL(t)dt}{RUL_0(T_e - T_s)}.$$

Re represents the toughness of the SPS under a maintenance strategy for a time period from a moment $T_s$ to a moment $T_e$. RUL(t) represents a corrected remaining useful life of the SPS at a moment t between $T_s$ to $T_e$.

Constructing the multi-objective optimization function with the optimization objectives of maximizing the toughness and minimizing the maintenance cost of the SPS includes:

S501: Calculate the maintenance cost. The maintenance cost of the SPS consists of three parts: a material cost, a maintenance resource cost, and a downtime loss. The material cost of the system is a purchase cost of a spare part for each component. The maintenance resource cost includes a maintenance team human resources cost, a maintenance tool rental or purchase cost, a vessel rental cost for subsea operations support, and the like. During maintenance of a subsea control system, a comprehensive daily cost of lifting subsea equipment by an engineering ship or a drilling ship is approximately 1.2 million yuan. The downtime loss is a production loss incurred during downtime. To quantify the production loss, a tree flow rate in the SPS is considered constant during downtime, and an average daily oil production value of the SPS is approximately 1.0232 million yuan. During emergency repair, total downtime is a sum of repair time of all components. The maintenance cost of the SPS may be expressed as $Cost=C_s+C_m+C_p$. Cost represents the maintenance cost of the SPS. $C_s$ represents the material cost. $C_m$ represents the maintenance resource cost. $C_p$ represents the downtime loss.

S502: Establish a maintenance optimization objective. Maintenance optimization with a single objective is likely to lead to over-maintenance or under-maintenance. If only costs are considered, delayed maintenance, reduced spare parts inventory, or reduced maintenance quality may be chosen, which may result in system performance degradation. If only system performance is concerned, maintenance may be over-invested, adding unnecessary costs. It is necessary to optimize the maintenance strategy by combining a plurality of indicators, to reduce the maintenance cost on the premise of ensuring optimal system performance. The maintenance optimization objective consists of two parts: the system toughness and maintenance cost. The maintenance optimization objective is to minimize the maintenance cost of the SPS on the premise of maximizing the toughness of the system.

Solving the multi-objective optimization function through the multi-objective optimization solution algorithm to obtain the optimal maintenance strategy for the SPS includes:

A maintenance threshold joint optimization model is established. A multi-objective particle swarm optimization algorithm is introduced to handle a multi-objective problem during maintenance optimization based on objective priorities. In the particle swarm optimization algorithm, each solution in a target space can be represented by a particle. In a DP-dimensional target search space, NP particles form a particle swarm. Each particle is a DP-dimensional vector.

To determine an initial position of each particle through a Latin hypercube sampling method, upper and lower bounds of optimized parameters need to be determined first. A value range of each parameter is evenly divided into SN sub-intervals. Each sub-interval is called a partition. For each parameter, a random number is generated within the corresponding partition. It needs to be ensured that the random number within each partition is unique. The generated random numbers are arranged in the order of the parameters. It is ensured that each column is a Latin hypercube. Each column in the Latin hypercube is mapped to a corresponding parameter space and used as the initial position of the particle swarm. An initial population position of the particle swarm is established through the Latin hypercube sampling method.

In a process of finding an optimal solution, each particle has individual behavior and group behavior. Each particle learns from two values: the individual's historical optimal value and the population's historical optimal value. The particle adjusts its velocity and position based on these two values. Quality of each position is determined by a fitness value. A spatial position of the particle is a solution of the objective optimization problem. It is substituted into a fitness function, namely an objective function, and the fitness value can be calculated. The quality of the particle can be measured based on the fitness value. An optimal position of each particle and a global optimal position are recorded. Then, the particle's flight velocity and position are updated. If the particle's flight velocity and position exceed the upper and lower bounds, the velocity and position are reset to the bounds, and the fitness value, the particle optimal position, and the global optimal position are updated again.

Based on the objective priorities, system toughness optimization with the higher priority is completed first, and then optimization of the target maintenance cost is completed. Correspondingly, the algorithm first finds a particle swarm solution set that achieves optimal toughness of the target system, and then finds a solution set that achieves an optimal maintenance cost of the target system within the particle swarm solution set that achieves the optimal toughness of the target system, to find a global optimal solution.

Embodiment 2

Embodiment 2 of the present disclosure provides an intelligent production optimization method for an offshore oil SPS, including the following steps:
  calculating a static health index of an SPS based on ashore sensor status data and Christmas tree sensor data of the SPS;
  determining whether production indicator parameters of the SPS under a current production strategy meet production optimization conditions, where the production indicator parameters include oil and gas production, energy consumption during production, the static health index, and reliability; and
  if the production optimization conditions are met, obtaining an optimal production strategy for the SPS through a multi-objective optimization algorithm with optimization objectives of maximizing the oil and gas production and the remaining useful life and minimizing the energy consumption during production of the SPS.

The remaining useful life is calculated through the following steps: estimating dynamic health indexes of the SPS at different moments through a Kalman filtering algorithm by using the static health index of the SPS as a dynamic health index at an initial moment; and calculating remaining useful lives of the SPS under different production strategies based on the dynamic health indexes at different moments.

In one embodiment, the nozzle opening and the motor frequency of each electric submersible pump of the SPS are controlled according to the optimal production strategy, so as to realize the control of the inlet pressure and the outlet pressure of the electric submersible pump, and thus to realize the optimal extraction of oil and gas. Specifically, the master control station 101 controls the nozzle opening and the motor frequency of each electric submersible pump through the electrical power unit 105, the hydraulic power unit 104, the subsea distribution unit 108, and the corresponding subsea control module.

S601: Establish an oil and gas production prediction model of the SPS based on an LSTM network. This process includes three steps: selecting the influencing factors of production, establishing the production prediction model, and debugging the production prediction model.

B1: Select the influencing factors of production. Through analyzing correlation, 5 parameters that have obvious impact on changes of production are selected from many variables as influencing factors of production, including inlet pressure $P_{in}$ of an electric submersible pump (ESP), a motor frequency $f_e$, a nozzle opening degree R, outlet pressure $P_t$ of the pump, and a water content $f_w$ of crude oil.

Figure 6:
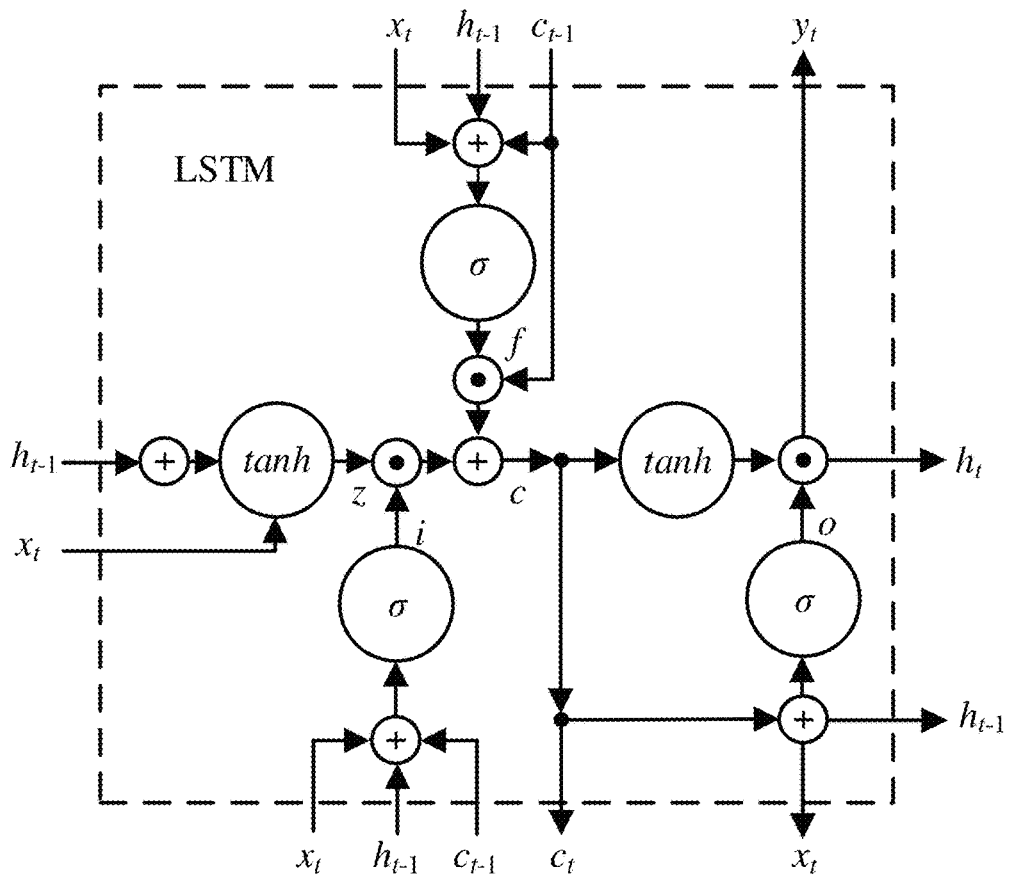
FIG. 6 is a cell diagram of a hidden layer of a long short-term memory (LSTM) network according to an embodiment of the present disclosure.

B2: Establish the production prediction model based on the LSTM network. A hidden layer at each moment in an LSTM neural network structure includes a memory block. Each memory block includes a plurality of memory units. Each memory unit includes a memory cell and three gates: an input gate, a forget gate, and an output gate. The input gate determines whether new information is input. The forget gate deletes unimportant information. The output gate determines what information is output. FIG. 6 shows a cellular structure of the hidden layer of the LSTM network. A forward calculation method may be expressed as follows:

$$i_t = \sigma(W_{xi}x_t + W_{hi}h_{t-1} + W_{ci}c_{t-1} + b_i)$$

$$f_t = \sigma(W_{xf}x_t + W_{hf}h_{t-1} + W_{cf}c_{t-1} + b_f)$$

$$c_t = f_t c_{t-1} + i_t \tanh(W_{xc}x_t + W_{hc}h_{t-1} + W_{hc}h_{t-1} + b_c)$$

$$o_t = \sigma(W_{xo}x_t + W_{ho}h_{t-1} + W_{co}c_t + b_p)$$

$$h_t = o_t \tanh(c_t)$$

i, f, c, and o respectively represent the input gate, forget gate, cell state, and output gate of each memory unit in the LSTM network. t represents a moment. W represents a weight coefficient matrix. b represents a bias term. $W_{xi}$ represents a weight coefficient matrix from an input layer to the input gate. $W_{hi}$ represents a weight coefficient matrix from the hidden layer to the input gate. $W_{ci}$ represents a weight coefficient matrix from the cell state to the input gate. $W_{xf}$ represents a weight coefficient matrix from the input layer to the forget gate. $W_{hf}$ represents a weight coefficient matrix from the hidden layer to the forget gate. $W_{cf}$ represents a weight coefficient matrix from the cell state to the forget gate. $W_{xc}$ represents a weight coefficient matrix from the input layer to the cell state. $W_{hc}$ represents a weight coefficient matrix from the hidden layer to the cell state. $W_{xo}$ represents a weight coefficient matrix from the input layer to the output gate. $W_{ho}$ represents a weight coefficient matrix from the hidden layer to the output gate. $W_{co}$ represents a weight coefficient matrix from the cell state to the output gate. $b_i$ represents a bias vector of the input gate. $b_f$ represents a bias vector of the forget gate. $b_c$ represents a bias vector of the cell state. $b_o$ represents a bias vector of the output gate. σ represents a sigmoid function. tanh represents a hyperbolic tangent activation function.

The oil and gas production prediction model based on the LSTM network includes the input layer, an LSTM network layer, a random deactivation layer, a fully connected layer, a regression layer, and an output layer. An electric submersible pump inlet pressure time series $p_{in}(t)$, a motor frequency time series $f_e(t)$, a nozzle opening degree time series $R_c(t)$, a pump outlet pressure time series $p_t(t)$, and a crude oil water content time series $f_w(t)$ with a same sampling time for a same tree are used as input of the production prediction model. An output time series $Y_{Pred}(t)$ is used as output of the production prediction model.

B3: Debug the production prediction model. The parameters of the production prediction model are adjusted such that production prediction accuracy of the model reaches an expected value. Finally, the parameters of the production prediction model are set as follows: An input sequence of the network has 5 dimensions. An output sequence of the network has 1 dimension. There are 200 units at the hidden layer. A unit discard rate of the random deactivation layer is 0.1. A gradient optimization algorithm is an Adam algorithm. A maximum training stride is 250. A gradient threshold is 1. An initial learning rate is 0,005. A learning rate decline period is 125. A learning rate decline factor is 0.2.

S602: Evaluate a production scheme. The production scheme is evaluated by comprehensively considering the dynamic health index of the SPS, target oil and gas production, oilfield energy consumption control conditions, external environmental impact, and the like.

The predicted oil and gas production is obtained based on a result of the production prediction model in S601, and a future production trend of an oilfield is determined. Based on a ratio of the predicted oil and gas production $Y_{Pred}$ to the target oil and gas production $Y_m$, a production target score $S_Y$ of the current production scheme is determined. $S_Y \in [0,5]$ and $$S_Y = \frac{Y_{Pred}}{Y_m} - 5.$$

Based on actual energy consumption of the current production scheme and target energy consumption of the oilfield, the energy consumption of the current production scheme is scored by relying on expert experience. An energy consumption score $S_E$ is obtained. $S_E \in [0,5]$.

Based on the Bayesian network model for evaluating the static health index of the SPS, a current health index of the SPS is extracted and converted into a system health index score $S_K$. $S_K \in [0,5]$.

Based on an operation condition of the current production scheme, a reliability score $S_R$ is obtained by relying on expert experience and comprehensively considering a device service life, an average time interval between faults, downtime, and the like. $S_R \in [0,5]$.

A comprehensive score S of the production scheme is obtained by summing the output target score $S_Y$, energy consumption score $S_E$, system health index score $S_K$, and reliability score $S_R$. The production scheme is determined as unqualified as follows:

The comprehensive score S of the production scheme is lower than 12 points.

Any one of the output target score $S_Y$, energy consumption score $S_E$, and reliability score $S_R$ is lower than or equal to 2.5 points.

The system health index score $S_K$ is less than 3 points.

Under the above circumstances, it is determined that the production scheme needs to be optimized and adjusted.

C2: If the production optimization conditions are met, obtain an optimal production strategy for the SPS through a multi-objective optimization algorithm with optimization objectives of maximizing the oil and gas production and a remaining useful life and minimizing the energy consumption during production of the SPS, where the remaining useful life is predicted through the foregoing remaining useful life prediction method, which specifically includes:

S603: Formulate a production scheme adjustment strategy. An optimal production scheme adjustment strategy for the SPS integrating system health monitoring, prediction, and control is proposed based on a health perception-enhanced model predictive control technology.

Figure 7:
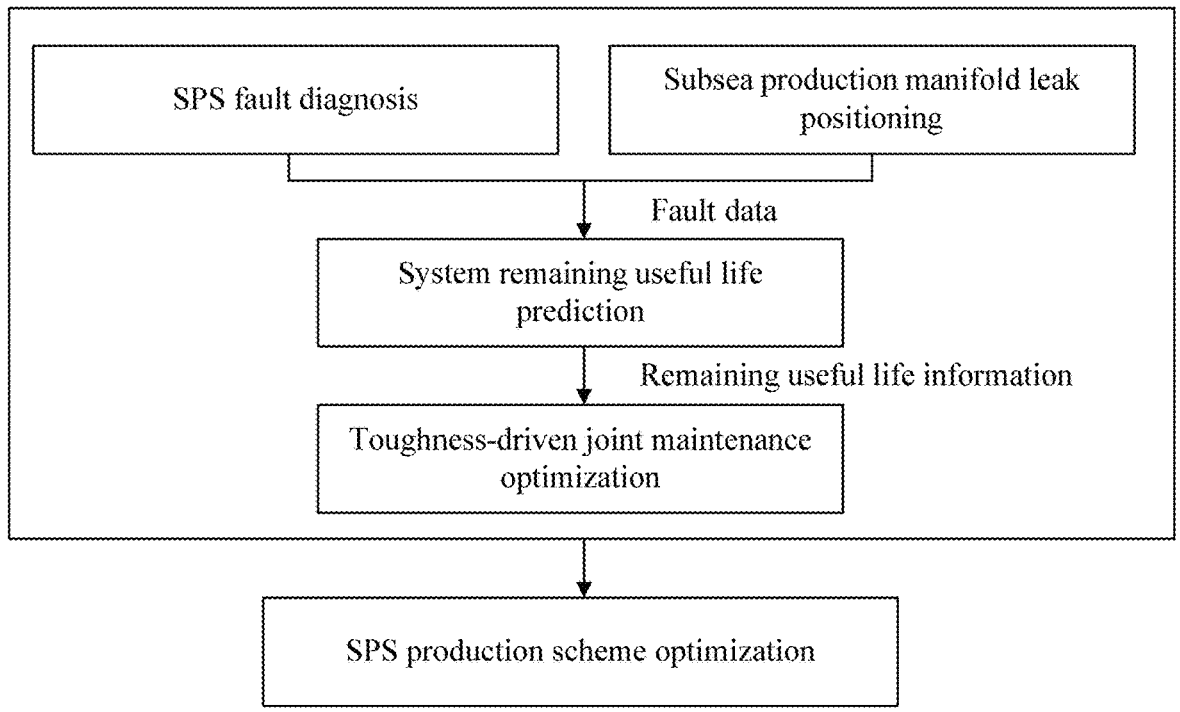
FIG. 7 is a flowchart of an intelligent production optimization method for an offshore oil SPS according to an embodiment of the present disclosure.

A system comprehensive health monitoring model is established. An SPS fault diagnosis model, SPS manifold leak positioning model, and SPS static health index evaluation Bayesian network model are fused to construct the system comprehensive health monitoring model, as shown in FIG. 7.

A predictive control reference curve is set. To avoid sharp changes in model input and output, specified values are softened online to form a gentle curve. A reference curve for the remaining useful life of the system is set based on the objective of maximizing the remaining useful life of the SPS.

Feedback correction is performed on the system comprehensive health monitoring model.

A model prediction error is obtained by using feedback information. Then, the model prediction error is used to correct the system comprehensive health monitoring model.

Rolling optimization is performed. A rolling finite time domain optimization strategy is used to optimize the production scheme of the SPS.

S604: Establish a multi-objective optimization model of the SPS based on a genetic-particle swarm optimization algorithm, and a dynamic model optimization strategy of the SPS integrating the system health status. A plurality of optimization objectives of the SPS are to maximize the production and remaining useful life and minimize the energy consumption during production.

The optimization objectives of maximizing the production and remaining useful life and minimizing the energy consumption during production can be determined by analyzing operation requirements of the device. Single-well production of the SPS is related to the formation production capacity, the regulation characteristic of the ESP, the water content of the well, and the like and is restricted by tubing back pressure and nozzle throttling.

The single-well fluid production is expressed as $Q=f(p_{in}, f_e, R_c, p_t, f_w)$.

Q represents the single-well fluid production. $P_{in}$ represents the inlet pressure of ESP. $f_e$ represents a motor frequency. $R_c$ represents a nozzle opening degree. $P_t$ represents the outlet pressure of ESP. $f_w$ represents the water content of the well.

An objective function for maximizing the production may be expressed as $$f_1 = \sum_{m=1}^{M} Q_m.$$

$f_1$ represents the production of the SPS. $Q_m$ represents fluid production of an $m^{th}$ oil well. M represents a number of oil wells in the SPS.

An objective function for minimizing the energy consumption during production may be expressed as $$f_2 = \sum_{m=1}^{M} P_{W,m}.$$

For single-well energy consumption, the power consumption of ESP is mainly considered, which is expressed as $$P_{W,m} \approx \frac{0.0112 \times Q_m \times \rho_m \times (a_e Q_m^2 + b_e R_{f,m} Q_m + c_e R_{f,m}^2)}{\eta}.$$

$f_2$ represents the energy consumption during production of the SPS. $P_{w,m}$ represents energy consumption during production of an $m^{th}$ oil well. M represents a number of oil wells in the SPS. $Q_m$ represents oil and gas production of the $m^{th}$ oil well. $\rho_m$ represents a fluid density of the $m^{th}$ oil well. $a_e$, $b_e$, and $c_e$ are respectively quadratic term, monomial term, and constant term characteristic parameters of a characteristic curve obtained through testing at a rated frequency of the electric submersible pump. $R_{f,m}$ represents a ratio of a current frequency of the electric submersible pump of the $m^{th}$ oil well to the rated frequency of the electric submersible pump. $\eta$ represents efficiency of the electric submersible pump.

In an actual production process of the electric submersible pump for the oil well, production strategy optimization mainly depends on adjustment to the motor frequency and nozzle opening degree of the electric submersible pump, which have significant impact on the remaining useful life of the SPS. Improper values of the motor frequency and nozzle opening degree may cause damage to the device. An improper combination of the two may cause the pump to work at a non-optimal working point, increase energy consumption and wear, and shorten the remaining useful life of the system. Production strategy optimization aims at finding an optimal combination of the motor frequency and nozzle opening degree.

0.1 year is selected as a time vector stride. Historical data of real oil well production conditions is used to construct a relationship equation of impact of changes in the motor frequency and nozzle opening degree of the electric submersible pump on the remaining useful life of the SPS as follows:

$$L(t_s) = RUL_1 - \int_0^{T_s} (k_1 f_e(\tau) + k_2 R_c(\tau) + k_3 f_e(\tau) R_c(\tau)) d\tau$$

$$RUL_1 = \inf\{t : MHI(t) \leq Ft | MHI(0) > Ft\}$$

$$MHI(t) = HI(t) + E_{HI}(t)$$

$L(t_s)$ represents the remaining useful life of the SPS under the $s^{th}$ production strategy. $t_s$ represents duration of the $s^{th}$ production strategy. $f_e(\tau)$ represents a motor frequency at a moment $\tau$ in the $s^{th}$ production strategy. $R_c(\tau)$ represents a nozzle opening degree at the moment $\tau$ in the $s^{th}$ production strategy. $k_1$ represents a coefficient describing impact of the motor frequency on the remaining useful life. $k_2$ represents a coefficient describing impact of the nozzle opening degree on the remaining useful life. $k_3$ represents a coefficient describing combined impact of the motor frequency and the nozzle opening degree on the remaining useful life.

$RUL_1$ represents a corrected remaining useful life of the SPS at a moment $T_s$. $T_s$ represents a moment at which a shock arrives. MHI(t) represents a corrected dynamic health index of the SPS at a moment t. HI(t) represents the dynamic health index of the SPS at the moment t. $E_{HI}(t)$ represents an additional health index due to the shock at the moment t. Ft represents a failure threshold of the SPS. MHI(0) represents a corrected static health index.

Figure 8:
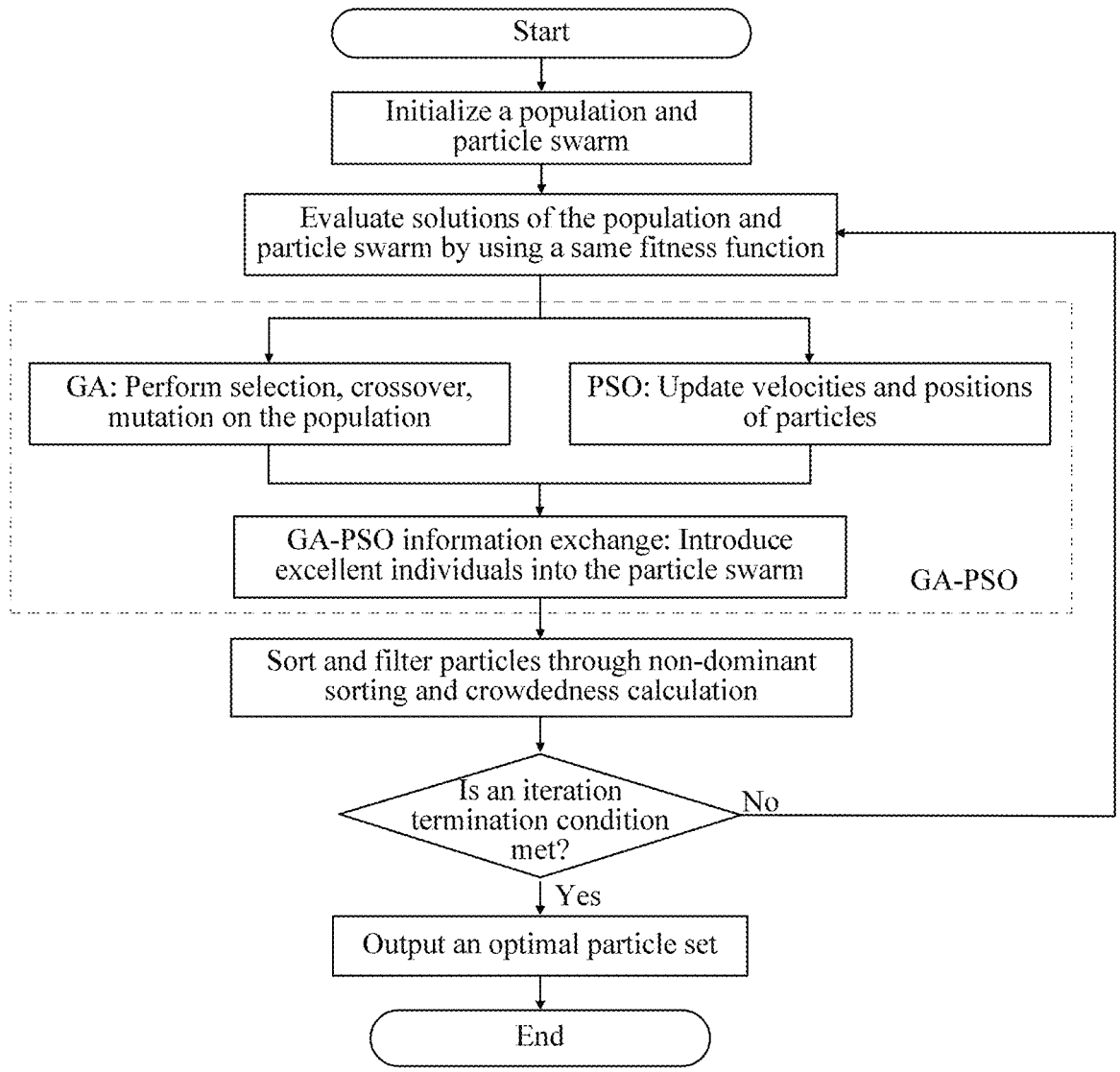
FIG. 8 is a flowchart of multi-objective optimization based on a genetic-particle swarm optimization algorithm according to an embodiment of the present disclosure.

The multi-objective optimization model of the SPS is based on the genetic-particle swarm optimization algorithm. The genetic algorithm and particle swarm optimization algorithm are widely used optimization algorithms at present. Their advantages and disadvantages are as follows: The particle swarm optimization algorithm is fast in solving, but it is easy to fall into local minimum due to a random oscillation phenomenon in a later stage, leading to lower accuracy. The genetic algorithm converges slowly, but it has unique selection, crossover, and mutation operations, which can increase diversity of a population and improve reliability of an optimization process. Compared with a traditional optimization algorithm, the genetic-particle swarm optimization algorithm integrates the advantages of the genetic algorithm and particle swarm optimization algorithm, effectively avoids falling into a local optimal solution, and ensures a global searching capability. FIG. 8 shows a genetic-particle swarm optimization mechanism.

The multi-objective optimization model of the SPS is solved through the genetic-particle swarm optimization algorithm.

(1) Randomly initialize the production scheme within a proper value range of optimization variables. The genetic algorithm and particle swarm optimization algorithm are respectively used to initialize a population and particle swarm. A number of individuals and particles is set to $N_{con}$.

(2) Evaluate individuals and particles in the population and particle swarm by using a same fitness function.

(3) Perform selection, crossover, and mutation on the population of the genetic algorithm to enhance the global search capability of the algorithm, and update positions and velocities of particles in the particle swarm to enhance the local search capability of the algorithm.

The genetic algorithm selects individuals based on their fitness values. Individuals with high fitness have higher probability of being inherited into a next-generation population. A roulette wheel selection method is used in the present disclosure. A crossover operator is used to generate new individuals. Two pairs of parent individuals are randomly selected to cross based on a selection probability in a selection operator to generate new offspring individuals.

A mutation operator is introduced to generate new individuals to maintain population diversity and prevent premature phenomena. During mutation, m random numbers are used to replace individuals with a probability of $P_m$, to obtain an offspring individual $(x_p, y_p)$. A mutation probability is 0.1.

A formula for generating offspring individuals is $$\begin{cases} (x_p, y_p) = w_i, w_m < P_m \\ (x_p, y_p) = (x_i, y_i), w_m \geq P_m. \end{cases}$$

$w_i$ and $w_m$ are random numbers. $(x_i, y_i)$ represents a parent individual.

After a plurality of iterations, a historically optimal position is determined.

(4) In order to promote a balance between global search and local search, introduce excellent individuals in the population into the particle swarm to implement information exchange between the genetic algorithm and particle swarm optimization algorithm.

(5) Sort and filter particles through non-dominant sorting and crowdedness calculation.

(6) Make iteration termination judgment. If an iteration termination condition is met, the algorithm stops and an optimal particle set is output. If the iteration termination condition is not met, steps (2) to (6) are repeated until the iteration termination condition is met.

(7) Output an optimized production scheme set based on a result of the genetic-particle swarm optimization algorithm.

Embodiment 3

Embodiment 3 of the present disclosure provides a computer system, including a memory, a processor, and a computer program stored in the memory and executable on the processor. The processor executes the computer program to implement the remaining useful life prediction method in Embodiment 1, the intelligent operation and maintenance optimization method in Embodiment 1, or the intelligent production optimization method in Embodiment 2.

Figure 9:
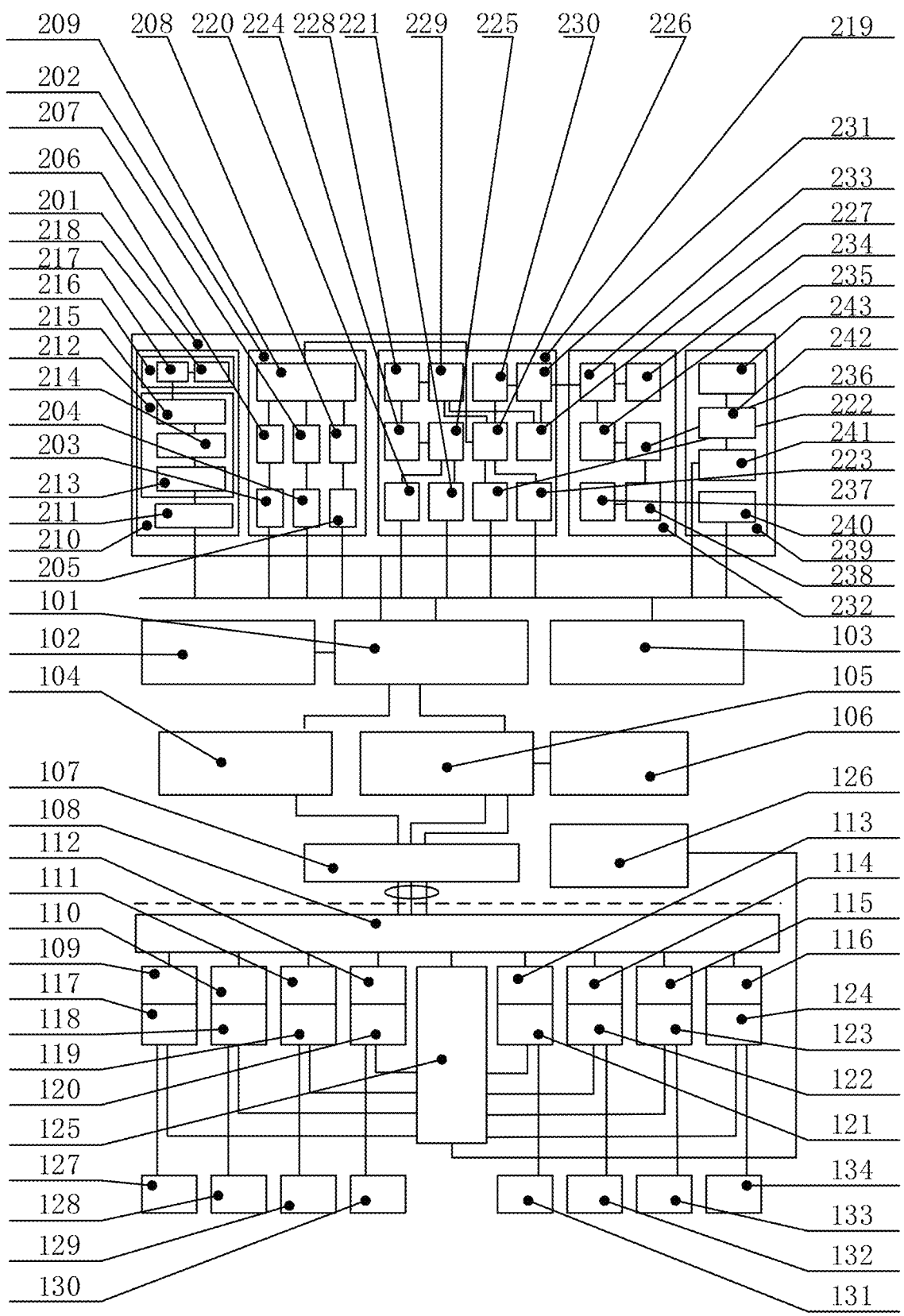
FIG. 9 is a schematic structural diagram of a computer system according to an embodiment of the present disclosure.

As shown in FIG. 9, a computer system 201 includes an SPS fault diagnosis subsystem 202, a subsea production manifold leak positioning subsystem 210, a system remaining useful life prediction subsystem 219, a toughness-driven joint maintenance optimization subsystem 232, and an SPS production scheme optimization subsystem 239.

The SPS fault diagnosis subsystem 202 includes a maritime component data acquisition module 203, a Christmas tree data acquisition module 204, an electric submersible pump data acquisition module 205, a maritime component fault diagnosis module 206, a Christmas tree fault diagnosis module 207, an electric submersible pump fault diagnosis module 208, and an SPS fault diagnosis module 209. The maritime component data acquisition module 203 is connected to the workstation 103 through a cable, and is configured to acquire monitoring data of the master control station 101, emergency shutdown apparatus 102, workstation 103, hydraulic power unit 104, electrical power unit 105, uninterruptible power supply 106, and umbilical 107. The Christmas tree data acquisition module 204 is connected to the workstation 103 through a cable, and is configured to acquire monitoring data of the first subsea control module 109, second subsea control module 110, third subsea control module 111, fourth subsea control module 112, fifth subsea control module 113, sixth subsea control module 114, seventh subsea control module 115, eighth subsea control module 116, first Christmas tree 117, second Christmas tree 118, third Christmas tree 119, fourth Christmas tree 120, fifth Christmas tree 121, sixth Christmas tree 122, seventh Christmas tree 123, and eighth Christmas tree 124. The electric submersible pump data acquisition module 205 is connected to the workstation 103 through a cable, and is configured to acquire monitoring data of the first electric submersible pump 127, second electric submersible pump 128, third electric submersible pump 129, fourth electric submersible pump 130, fifth electric submersible pump 131, sixth electric submersible pump 132, seventh electric submersible pump 133, and eighth electric submersible pump 134. The maritime component fault diagnosis module 206 is connected to the maritime component data acquisition module 203 through a cable, and is configured to diagnose fault statuses of the master control station 101, emergency shutdown apparatus 102, workstation 103, hydraulic power unit 104, electrical power unit 105, uninterruptible power supply 106, and umbilical 107. The Christmas tree fault diagnosis module 207 is connected to the Christmas tree data acquisition module 204 through a cable, and is configured to diagnose fault statuses of the first subsea control module 109, second subsea control module 110, third subsea control module 111, fourth subsea control module 112, fifth subsea control module 113, sixth subsea control module 114, seventh subsea control module 115, eighth subsea control module 116, first Christmas tree 117, second Christmas tree 118, third Christmas tree 119, fourth Christmas tree 120, fifth Christmas tree 121, sixth Christmas tree 122, seventh Christmas tree 123, and eighth Christmas tree 124. The electric submersible pump fault diagnosis module 208 is connected to the electric submersible pump data acquisition module 205 through a cable, and is configured to diagnose fault statuses of the first electric submersible pump 127, second electric submersible pump 128, third electric submersible pump 129, fourth electric submersible pump 130, fifth electric submersible pump 131, sixth electric submersible pump 132, seventh electric submersible pump 133, and eighth electric submersible pump 134. The SPS fault diagnosis module 209 is connected to the maritime component fault diagnosis module 206, Christmas tree fault diagnosis module 207, and electric submersible pump fault diagnosis module 208 through cables, and is configured to diagnose an overall fault status of the SPS.

The subsea production manifold leak positioning subsystem 210 includes a manifold pressure signal acquisition module 211, a manifold pressure signal processing module 212, and a manifold leak positioning module 216. The manifold pressure signal acquisition module 211 is connected to the workstation 103 through a cable, and is configured to acquire monitoring data of the central manifold 125. The manifold pressure signal processing module 212 includes a wave velocity calculation unit 213, a signal denoising unit 214, and a sensor matching unit 215. The wave velocity calculation unit 213 is connected to the manifold pressure signal acquisition module 211 through a cable, and is configured to calculate a propagation velocity of a pressure wave. The signal denoising unit 214 is connected to the wave velocity calculation unit 213 through a cable, and is configured to denoise a pressure signal. The sensor matching unit 215 is connected to the signal denoising unit 214 through a cable, and is configured to select a corresponding sensor pressure signal. The manifold leak positioning module 216 includes a time difference calculation unit 217 and a leak positioning unit 218. The time difference calculation unit 217 is connected to the sensor matching unit 215 through a cable, and is configured to calculate a time difference of arrival of the pressure wave. The leak positioning unit 218 is connected to the time difference calculation unit 217 through a cable, and is configured to obtain a position of the leak.

The system remaining useful life prediction subsystem 219 includes a maritime module historical monitoring data acquisition module 220, a subsea module historical monitoring data acquisition module 221, a maritime module online monitoring data acquisition module 222, a subsea module online monitoring data acquisition module 223, a system reliability calculation module 224, a failure rate calculation module 225, a health index calculation module 226, a failure threshold calculation module 227, a sensitivity calculation module 228, a distribution index calculation module 229, a dynamic health index calculation module 230, and a remaining useful life calculation module 231. The maritime module historical monitoring data acquisition module 220 is connected to the workstation 103 through a cable, and is configured to acquire historical monitoring data of the master control station 101, emergency shutdown apparatus 102, workstation 103, hydraulic power unit 104, electrical power unit 105, uninterruptible power supply 106, and umbilical 107. The subsea module historical monitoring data acquisition module 221 is connected to the workstation 103 through a cable, and is configured to acquire historical monitoring data of the first subsea control module 109, second subsea control module 110, third subsea control module 111, fourth subsea control module 112, fifth subsea control module 113, sixth subsea control module 114, seventh subsea control module 115, eighth subsea control module 116, first Christmas tree 117, second Christmas tree 118, third Christmas tree 119, fourth Christmas tree 120, fifth Christmas tree 121, sixth Christmas tree 122, seventh Christmas tree 123, eighth Christmas tree 124, central manifold 125, first electric submersible pump 127, second electric submersible pump 128, third electric submersible pump 129, fourth electric submersible pump 130, fifth electric submersible pump 131, sixth electric submersible pump 132, seventh electric submersible pump 133, and eighth electric submersible pump 134. The maritime module online monitoring data acquisition module 222 is connected to the workstation 103 through a cable, and is configured to acquire online monitoring data of the master control station 101, emergency shutdown apparatus 102, workstation 103, hydraulic power unit 104, electrical power unit 105, uninterruptible power supply 106, and umbilical 107. The subsea module online monitoring data acquisition module 223 is connected to the workstation 103 through a cable, and is configured to acquire online monitoring data of the first subsea control module 109, second subsea control module 110, third subsea control module 111, fourth subsea control module 112, fifth subsea control module 113, sixth subsea control module 114, seventh subsea control module 115, eighth subsea control module 116, first Christmas tree 117, second Christmas tree 118, third Christmas tree 119, fourth Christmas tree 120, fifth Christmas tree 121, sixth Christmas tree 122, seventh Christmas tree 123, eighth Christmas tree 124, central manifold 125, first electric submersible pump 127, second electric submersible pump 128, third electric submersible pump 129, fourth electric submersible pump 130, fifth electric submersible pump 131, sixth electric submersible pump 132, seventh electric submersible pump 133, and eighth electric submersible pump 134. The failure rate calculation module 225 is connected to the maritime module historical monitoring data acquisition module 220 and the subsea module historical monitoring data acquisition module 221 through cables, and is configured to calculate a failure rate of each module of the SPS. The system reliability calculation module 224 is connected to the failure rate calculation module 225 through a cable, and is configured to calculate overall reliability of the SPS. The sensitivity calculation module 228 is connected to the system reliability calculation module 224 through a cable, and is configured to analyze a sensitivity of each module of the SPS. The distribution index calculation module 229 is connected to the sensitivity calculation module 228 through a cable, and is configured to calculate a distribution index. The health index calculation module 226 is connected to the maritime module online monitoring data acquisition module 222, subsea module online monitoring data acquisition module 223, SPS fault diagnosis module 209, and distribution index calculation module 229 through cables, and is configured to calculate a static health index of the SPS. The failure threshold calculation module 227 is connected to the distribution index calculation module 229 through a cable, and is configured to calculate a failure threshold of the SPS. The dynamic health index calculation module 230 is connected to the health index calculation module 226 through a cable, and is configured to calculate a dynamic health index of the SPS. The remaining useful life calculation module 231 is connected to the dynamic health index calculation module 230 and the failure threshold calculation module 227 through cables, and is configured to calculate a remaining useful life of the SPS.

The toughness-driven joint maintenance optimization subsystem 232 includes a competing failure calculation module 233, an external shock evaluation module 234, a remaining useful life correction module 235, a toughness evaluation module 236, a maintenance cost calculation module 237, and a joint maintenance decision module 238. The external shock evaluation module 234 is configured to construct an external shock model. The competing failure calculation module 233 is connected to the remaining useful life calculation module 231 and the external shock evaluation module 234 through cables, and is configured to construct a competing failure model of the SPS. The remaining useful life correction module 235 is connected to the competing failure calculation module 233 through a cable, and is configured to correct the remaining useful life of the SPS. The toughness evaluation module 236 is connected to the remaining useful life correction module 235 through a cable, and is configured to evaluate toughness of the SPS. The maintenance cost calculation module 237 is configured to evaluate a maintenance cost of the SPS. The joint maintenance decision module 238 is connected to the toughness evaluation module 236 and the maintenance cost calculation module 237 through cables, and is configured to make a joint maintenance decision of the SPS.

The SPS production scheme optimization subsystem 239 includes a production scheme evaluation module 240, an oil and gas production prediction module 241, a production scheme adjustment decision module 242, and a production scheme optimization module 243. The production scheme evaluation module 240 is connected to the workstation 103 through a cable, and is configured to integrate operation information of the SPS and comprehensively evaluate a production scheme. The oil and gas production prediction module 241 is connected to the workstation 103 through a cable, and is configured to predict oil and gas production of the SPS. The production scheme adjustment decision module 242 is connected to the oil and gas production prediction module 241 through a cable, and is configured to adjust the production scheme of the SPS. The production scheme optimization module 243 is connected to the production scheme adjustment decision module 242 through a cable, and is configured to optimize the production scheme of the SPS.

During operation of the SPS, the SPS fault diagnosis subsystem 202 evaluates fault information of each module of the SPS based on the monitoring data of the workstation 103. The subsea production manifold leak positioning subsystem 210 evaluates leak positioning of the central manifold 125 based on the monitoring data of the workstation 103. The system remaining useful life prediction subsystem 219 evaluates the remaining useful life of the SPS based on the historical monitoring data and online monitoring data of the workstation 103, and the fault information calculated by the SPS fault diagnosis subsystem 202. The toughness-driven joint maintenance optimization subsystem 232 makes the joint maintenance decision of the SPS based on the remaining useful life information calculated by the system remaining useful life prediction subsystem 219. The SPS production scheme optimization subsystem 239 optimizes the production scheme of the SPS based on the monitoring data of the workstation 103. The intelligent operation and maintenance and production optimization system 201 for an offshore oil SPS is connected to the master control station 101 through a cable, and is configured to provide the fault information, leak positioning information, remaining useful life information, joint maintenance decision information, and production scheme optimization information of the SPS. Relevant personnel extract the information to formulate an operation and maintenance scheme to ensure safety of oil and gas production.

Those of ordinary skill in the art may understand that all or some of the procedures in the method of the foregoing embodiments may be implemented by a computer program instructing related hardware. The computer program may be stored in a non-volatile computer-readable storage medium. When the computer program is executed, the procedures in the embodiments of the foregoing method may be performed. Any reference to a memory, a database, or other media used in the embodiments of the present disclosure may include at least one of a non-volatile memory and a volatile memory. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, or the like. The volatile memory may include a random access memory (RAM), an external cache memory, or the like. As an illustration rather than a limitation, the RAM may be in various forms, such as a static RAM (SRAM) or a dynamic RAM (DRAM). The database in the embodiments of the present disclosure may include at least one of a relational database and a non-relational database. The non-relational database may include a distributed database based on a blockchain, but is not limited thereto. The processor in the embodiments of the present disclosure may be a general processor, a central processor, a graphics processor, a digital signal processor (DSP), a programmable logic device, and a data processing logic device based on quantum computing, but is not limited thereto.

The technical characteristics of the foregoing embodiments can be employed in arbitrary combinations. To provide a concise description of these embodiments, all possible combinations of all the technical characteristics of the foregoing embodiments may not be described; however, these combinations of the technical characteristics should be construed as falling within the scope defined by the specification as long as no contradiction occurs.

Particular examples are used herein for illustration of principles and implementation modes of the present disclosure. The descriptions of the foregoing embodiments are merely used for assisting in understanding the method of the present disclosure and its core ideas. In addition, those of ordinary skill in the art can make various modifications in terms of particular implementation modes and the scope of application in accordance with the ideas of the present disclosure. In conclusion, the content of this specification shall not be construed as limitations to the present disclosure.

What is claimed is:

1. An intelligent operation and maintenance optimization method for an offshore oil subsea production system (SPS), comprising the following steps:
   determining whether there is a leak in an SPS; and
   if there is a leak in the SPS, performing emergency repair; or
   if there is no leak in the SPS, performing intelligent operation and maintenance optimization; wherein
   the performing emergency repair comprises:
   determining a leak position of the SPS; and
   immediately repairing the SPS based on the leak position; and
   the performing intelligent operation and maintenance optimization comprises:
   calculating a static health index of the SPS based on ashore sensor status data and Christmas tree sensor data of the SPS;
   estimating dynamic health indexes of the SPS at different moments through a Kalman filtering algorithm by using the static health index of the SPS as a dynamic health index at an initial moment;
   calculating toughness of the SPS under different maintenance strategies based on the dynamic health indexes at different moments;
   constructing a multi-objective optimization function with optimization objectives of maximizing the toughness and minimizing a maintenance cost of the SPS;
   solving the multi-objective optimization function through a multi-objective optimization solution algorithm to obtain an optimal maintenance strategy for the SPS; and
   maintaining the SPS based on the optimal maintenance strategy;
   wherein maintaining the SPS based on the optimal maintenance strategy comprises:
   releasing a remotely operated vehicle (ROV) by a vessel for subsea operation support to repair or maintain a subsea distribution unit, subsea control modules, Christmas trees, and electric submersible pumps in the SPS according to the optimal maintenance strategy;
   wherein determining whether there is a leak in the SPS comprises:
   obtaining an acoustic wave signal and a pressure wave signal at each detection position in a current time period, wherein the acoustic wave signal is detected by an acoustic wave sensor at each detection position, and the pressure wave signal is detected by a pressure sensor at each detection position;
   performing correlation calculation on the acoustic wave signal and the pressure wave signal at each detection position to obtain a correlation coefficient at each detection position; and
   if the correlation coefficient at each detection position in a current time period is less than a correlation coefficient threshold, determining that there is no leak in the SPS, otherwise determining that there is a leak in the SPS.

2. The intelligent operation and maintenance optimization method for an offshore oil SPS according to claim 1, wherein the determining a leak position of the SPS comprises:
   determining that a detection position with a correlation coefficient not less than the correlation coefficient threshold in the current time period is an upstream detection position of a leaking pipeline and a current moment is a moment at which a target wave signal generated at the leak position is detected at the upstream detection position, wherein a target wave is a pressure wave or an acoustic wave, and the target wave signal is a pressure wave signal or an acoustic wave signal;
   determining, based on a correlation coefficient at a downstream detection position of the leaking pipeline in the current time period, a moment at which the target wave signal generated at the leak position is detected at the downstream detection position; and determining the leak position through a leak positioning model based on a time difference between the moment at which the target wave signal generated at the leak position is detected at the upstream detection position and the moment at which the target wave signal generated at the leak position is detected at the downstream detection position.

3. The intelligent operation and maintenance optimization method for an offshore oil SPS according to claim 2, wherein the leak positioning model is as follows:

$$X_{d1} = \frac{1}{2\alpha}\left[L(\alpha - v_d) + \Delta t_{12}(\alpha^2 - v_d^2)\right]$$

wherein $x_{d1}$ represents a distance between the leak position and the upstream detection position, $\alpha$ represents a propagation velocity of the target wave, L represents a distance between the upstream detection position and the downstream detection position, $v_d$ represents a flow velocity of fluid in the leaking pipeline, and $\Delta t_{12}$ represents the time difference between the moment at which the target wave signal generated at the leak position is detected at the upstream detection position and the moment at which the target wave signal generated at the leak position is detected at the downstream detection position.

4. The intelligent operation and maintenance optimization method for an offshore oil SPS according to claim 3, wherein a propagation velocity of a pressure wave is calculated by using the following formula:

$$A\alpha = \frac{1}{\sqrt{\rho\left(\frac{1}{K} + \frac{D}{\delta E}\left(\frac{1}{1+\frac{\delta}{D}}\left[(1-\mu^2) + 2\frac{\delta}{D}(1+\mu)\left(1+\frac{\delta}{D}\right)\right]\right)\right)}}$$

wherein $A\alpha$ represents the propagation velocity of the pressure wave, $\rho$ represents a density of fluid in a pipeline, K represents a bulk modulus of the fluid in the pipeline, D represents an average inner diameter of the pipeline, $\delta$ represents a wall thickness of the pipeline, E represents an elastic modulus of the pipeline, and $\mu$ represents a correction coefficient of the pipeline.

5. The intelligent operation and maintenance optimization method for an offshore oil SPS according to claim 3, wherein a propagation velocity of an acoustic wave is calculated by using the following formula:

$$c = 1402.7 + 488T - 482T^2 + 135T^3(15.9 + 2.8T + 2.4T^2)(Ps/100)$$

wherein C represents the propagation velocity of the acoustic wave, T represents a temperature of fluid in a pipeline, and Ps represents static pressure in the pipeline.

6. The intelligent operation and maintenance optimization method for an offshore oil SPS according to claim 1, after the obtaining an acoustic wave signal and a pressure wave signal at each detection position in a current time period, further comprising:

denoising the pressure wave signal through a wavelet transform-based filtering method; and denoising the acoustic wave signal through a spectral subtraction method.

7. The intelligent operation and maintenance optimization method for an offshore oil SPS according to claim 1, wherein the calculating a static health index of the SPS based on ashore sensor status data and Christmas tree sensor data of the SPS comprises:

obtaining the ashore sensor status data and the Christmas tree sensor data of the SPS;

calculating a fault probability of each component of the SPS based on the ashore sensor status data and the Christmas tree sensor data;

calculating a distribution index of each component of the SPS; and calculating the static health index of the SPS based on the fault probability and the distribution index of each component.

8. The intelligent operation and maintenance optimization method for an offshore oil SPS according to claim 7, wherein the calculating a fault probability of each component of the SPS based on the ashore sensor status data and the Christmas tree sensor data comprises:

calculating the fault probability of each maritime component of the SPS based on the ashore sensor status data by using the following formula:

$$P(U_x|S_1(s_1), S_2(s_2), \ldots S_b(s_b)) = \frac{P(S_1(s_1), S_2(s_2), \ldots, S_b(s_b)|U_x)P(U_x)}{P(S_1(s_1))P(S_2(s_2)) \ldots P(S_b(s_b))}$$

wherein $P(U_x|S_1(s_1), S_2(s_2), \ldots, S_b(s_b))$ represents a fault probability of a maritime component $U_x$ if statuses of $1^{st}, 2^{nd}, \ldots$, and $b^{th}$ ashore sensors of the SPS are $S_1(1)$, $S_2(s_2), \ldots$, and $S_b(s_b)$, $S_1(s_1)$ $S_2(s_2)$, and $S_b(s_b)$ represent the statuses of the $1^{st}, 2^{nd}$, and $b^{th}$ ashore sensors, b represents a number of ashore sensors, $P(S_1(s_1), S_2(s_2), \ldots, S_b(s_b)|U_x)$ represents a probability that the statuses of the $1^{st}, 2^{nd}, \ldots$, and $b^{th}$ ashore sensors of the SPS are $S_1(s_1), S_2(s_2), \ldots$, and $S_b(s_b)$ if the maritime component $U_x$ is faulty, $P(U_x)$ represents a fault probability of the maritime component $U_x$, $P(S_1(s_1))$ represents a probability that the status of the $1^{st}$ ashore sensor of the SPS is $S_1(s_1)$, $P(S_2(s_2))$ represents a probability that the status of the $2^{nd}$ ashore sensor of the SPS is $S_2(s_2)$, and $P(S_b(s_b))$ represents a probability that the status of the $b^{th}$ ashore sensor of the SPS is $S_b(s_b)$; and calculating the fault probability of each Christmas tree component of the SPS based on the Christmas tree sensor data by using the following formula:

$$P(T_x|C_1(c_1), C_2(c_2), \ldots, C_c(c_c)) = \frac{P(C_1(c_1), C_2(c_2), \ldots, C_c(c_c)|T_x)P(T_x)}{P(C_1(c_1))P(C_2(c_2)) \ldots P(C_c(c_c))}$$

wherein $P(T_x|C_1(c_1), C_2(c_2), \ldots, C_c(c_c))$ represents a fault probability of a Christmas tree component $T_x$ if statuses of $1^{st}, 2^{nd}, \ldots$, and $c^{th}$ Christmas tree sensors of the SPS are $C_1(c_1), C_2(c_2), \ldots$, and $C_c(c_c)$, $P(C_1(c_1), C_2(c_2), \ldots, C_c(c_c)|T_x)$ represents a probability that the statuses of the $1^{st}, 2^{nd}, \ldots$, and $c^{th}$ Christmas tree sensors of the SPS are $C_1(c_1), C_2(c_2), \ldots$, and $C_c(c_c)$ if the Christmas tree component Tris faulty, $P(T_x)$ represents a fault probability of the Christmas tree component $T_x$, $P(C_1(c_1))$ represents a probability that the status of the $1^{st}$ Christmas tree sensor of the SPS is $C_1(c_1)$, $P(C_2(c_2))$ represents a probability that the status of the $2^{nd}$ Christmas tree sensor of the SPS is $C_2(c_2)$, and $P(C_c(c_c))$ represents a probability that the status of the $c^{th}$ Christmas tree sensor of the SPS is $C_c(c_c)$.

9. The intelligent operation and maintenance optimization method for an offshore oil SPS according to claim 7, after the calculating a fault probability of each component of the SPS based on the ashore sensor status data and the Christmas tree sensor data, further comprising:
  determining a fault status of each target component in a target component set based on a fault probability of each target component in the target component set, wherein the target component set is a maritime component set or a subsea component set, each target component in the maritime component set is a maritime component, and each target component in the subsea component set is a Christmas tree component;
  inputting the fault status of each target component in the target component set into a digital twin model to obtain pressure of a hydraulic circuit behind each target component output by the digital twin model;
  calculating a diagnosis result error of the target component set based on the pressure of the hydraulic circuit behind each target component; and
  if the diagnosis result error is greater than an error threshold, recalculating the fault probability of each target component in the target component set.

10. The intelligent operation and maintenance optimization method for an offshore oil SPS according to claim 9, wherein the determining a fault status of each target component in a target component set based on a fault probability of each target component in the target component set comprises:

if the fault probability of the target component is greater than a fault probability threshold, determining that the fault status of the target component is faulty, otherwise determining that the fault status of the target component is unfaulty.

11. The intelligent operation and maintenance optimization method for an offshore oil SPS according to claim 9, wherein the digital twin model is as follows:

$$p_i + \rho g h_i + \frac{1}{2}\rho v_i^2 = \left(p_{i-1} + \rho g h_{i-1} + \frac{1}{2}\rho v_{i-1}^2\right)\xi_{i-1}\tau_{i-1}\varphi_{i-1}$$

wherein $p_i$ represents the pressure of the hydraulic circuit behind the $i^{th}$ target component output by the digital twin model, $\rho$ represents a fluid density of a hydraulic circuit in which the target component is located, g represents an acceleration of gravity, which is 9.8 m/s², $h_i$ represents a height of the hydraulic circuit behind the $i^{th}$ target component, $v_i$ represents a flow velocity of fluid behind the $i^{th}$ target component, $p_{i-1}$ represents pressure of a hydraulic circuit in front of the $i^{th}$ target component, $h_{i-1}$ represents a height of the hydraulic circuit in front of the $i^{th}$ $\tau_{i-1}$ target component, $v_{i-1}$ represents a flow velocity of fluid in front of the $i^{th}$ target component, represents a control parameter in front of the $i^{th}$ target component, $\xi_{i-1}$ represents a loss parameter in front of the $i^{th}$ target component, $\varphi_{i-1}$ represents a fault parameter of the $i^{th}$ target component, and a value of the fault parameter is 0 if the $i^{th}$ target component is considered faulty, and 1 otherwise.

12. The intelligent operation and maintenance optimization method for an offshore oil SPS according to claim 9, wherein the diagnosis result error is calculated by using the following formula:

$$E_u = \frac{\sum_{i=1}^{I} \frac{|p_i - rp_i|}{rp_i}}{I} \times 100\%$$

wherein $E_u$ represents the diagnosis result error of the target component set, $p_i$ represents the pressure of the hydraulic circuit behind the $i^{th}$ target component output by the digital twin model, $rp_i$ represents actually read pressure of the hydraulic circuit behind the $i^{th}$ target component, and I represents a number of target components in the target component set.

13. The intelligent operation and maintenance optimization method for an offshore oil SPS according to claim 9, wherein if the target component set is a maritime component set, the fault probability of each target component in the target component set is recalculated by using the following formula:

$$P(U_x|S_1(s_1), S_2(s_2), \ldots, S_b(s_b), UF_1(U/N), UF_2(U/N), \ldots, UF_{I1}(U/N)) = $$
$$\frac{P(S_1(s_1), S_2(s_2), \ldots, S_b(s_b), UF_1(U/N), UF_2(U/N), \ldots, UF_{I1}(U/N)|U_x)P(U_x)}{P(S_1(s_1))P(S_2(s_2)) \ldots P(S_b(s_b))};$$

wherein $P(U_x|S_1(s_1), S_2(s_2), \ldots, S_b(s_b), UF_1(U/N), UF_2(U/N), \ldots, UF_{I1}(U/N))$ represents a fault probability of a maritime component $U_x$ if statuses of $1^{st}$, $2^{nd}, \ldots$, and $b^{th}$ ashore sensors of the SPS are $S_1(s_1)$, $S_2(s_2), \ldots$, and $S_b(s_b)$ and feedback information is $UF_1(U/N), UF_2(U/N), \ldots$, and $UF_{I1}(U/N)$, $UF_1(U/N)$ $UF_2(U/N)$, and $UF_1(U/N)$ represent feedback information of $1^{st}$, $2^{nd}$, and $I1^{th}$ maritime components, $P(S_1(s_1), S_2(s_2), \ldots, S_b(s_b), UF_1(U/N), UF_2(U/N), \ldots, UF_{I1}(U/N)|U_x)$ represents a probability that the statuses of the $1^{st}$, $2^{nd}, \ldots$, and $b^{th}$ ashore sensors of the SPS are $S_1(s_1)$, $S_2(s_2), \ldots$, and $S_b(s_b)$ and the feedback information is $UF_1(U/N), UF_2(U/N), \ldots$, and $UF_{I1}$ (U/N) if the maritime component $U_x$ is faulty, $P(U_x)$ represents a fault probability of the maritime component $U_x$, $P(S_1(s_1))$ represents a probability that the status of the $1^{st}$ ashore sensor of the SPS is $S_1(s_1)$, $P(S_2(s_2))$ represents a probability that the status of the 2nd ashore sensor of the SPS is $S_2(s_2)$, $P(S_b(s_b))$ represents a probability that the status of the $b^{th}$ ashore sensor of the SPS is $S_b(s_b)$, =I1 represents a number of maritime components in the maritime component set; and if the target component set is a subsea component set, the fault probability of each target component in the target component set is recalculated by using the following formula:

$$P(T_x|C_1(c_1), C_2(C_2), \ldots, C_c(c_c), TF_1(U/N), TF_2(U/N), \ldots, TF_{I2}(U/N)) =$$

$$\frac{P(C_1(c_1), C_2(c_2), \ldots, C_c(c_c), TF_1(U/N), TF_2(U/N), \ldots, TF_{I2}(U/N)|T_x)P(T_x)}{P(C_1(c_1))P(C_2(c_2)) \ldots P(C_c(c_c))};$$

wherein
$P(T_x|C_1(c_1), C_2(c_2), \ldots, C_c(c_c), TF_1(U/N), TF_2(U/N), \ldots, TF_{I2}(U/N))$ represents a fault probability of a Christmas tree component Ty if statuses of $1^{st}$, $2^{nd}, \ldots$, and $c^{th}$ Christmas tree sensors of the SPS are $C_1(c_1), C_2(c_2), \ldots$, and $C_c(c_c)$ and feedback information is $TF_1(U/N), TF_2(U/N), \ldots$, and $TF_{I2}(U/N)$, $P(C_1(c_1), C_2(c_2), \ldots, C_c(c_c), TF_1(U/N), TF_2 (U/N), \ldots, TF_{I2}(U/N)|T_x)$ represents a probability that the statuses of the $1^{st}, 2^{nd}, \ldots$, and $c^{th}$ Christmas tree sensors of the SPS are $C_1(c_1), C_2(c_2), \ldots$, and $C_c(c_c)$ and the feedback information is $TF_1(U/N)$, $TF_2(U/N), \ldots$, and $TF_{I2}(U/N)$ if the Christmas tree component $T_x$ is faulty, $P(T_x)$ represents a fault probability of the Christmas tree component $T_x$, $P(C_1(c_1))$ represents a probability that the status of the $1^{st}$ Christmas tree sensor of the SPS is $C_1(c_1)$, $P(C_2(c_2))$ represents a probability that the status of the $2^{nd}$ Christmas tree sensor of the SPS is $C_2(c_2)$, $P(C_c(c_c))$ represents a probability that the status of the $c^{th}$ Christmas tree sensor of the SPS is $C_c(c_c)$, and I2 represents a number of Christmas tree components in the subsea component set.

14. The intelligent operation and maintenance optimization method for an offshore oil SPS according to claim 7, wherein the calculating a distribution index of each component of the SPS comprises:
constructing an exponential degradation model of each components;
connecting the exponential degradation model of each components in series based on dependencies between the components, to obtain an overall reliability model of the SPS;
calculating a sensitivity of each component to overall reliability of the SPS based on the overall reliability model; and
calculating the distribution index of each component based on the sensitivity of each component to the overall reliability of the SPS by using the following formula:

$$\xi_j = \frac{se_j}{\sum_{j'=1}^{J} se_{j'}}$$

wherein $\xi_j$ represents the distribution index of the $j^{th}$ component, $se_j$ and $se_j$ respectively represent the sensitivities of the $j^{th}$ and $j'^{th}$ components to the overall reliability of the SPS, and J represents a number of components in the SPS.

15. The intelligent operation and maintenance optimization method for an offshore oil SPS according to claim 7, wherein the calculating the static health index of the SPS based on the fault probability and the distribution index of each component comprises:
calculating the static health index of the SPS based on the fault probability and the distribution index of each component by using the following formula:

$$HI = \begin{bmatrix} (1-d_1)p_1 \\ (1-d_2)p_2 \\ \vdots \\ (1-d_J)p_J \end{bmatrix}^T \times \begin{bmatrix} \xi_1 \\ \xi_2 \\ \vdots \\ \xi_J \end{bmatrix}$$

wherein HI represents the static health index of the SPS, $d_1 d_1$, $d_2$, and $d_J$ respectively represent the fault probabilities of the $1^{st}, 2^{nd}$, and $J^{th}$ components of the SPS, $p_1, p_2$, and $p_J$ respectively represent performance of the $1^{st}, 2^{nd}$, and $J^{th}$ components of the SPS, $\xi_1, \xi_2$, and $\xi_J$, respectively represent the distribution indexes of the $1^{st}, 2^{nd}$, and $J^{th}$ components of the SPS, and J represents a number of components in the SPS.

16. The intelligent operation and maintenance optimization method for an offshore oil SPS according to claim 15, wherein performance of each component of the SPS is calculated by using the following formula:

$$p_j = \frac{\sum_{n=1}^{N} mon_n}{N \times best_j}$$

wherein $p_j$ represents the performance of the $j^{th}$ component of the SPS, $mon_n$ represents a value of an $n^{th}$ monitoring point of the $j^{th}$ component, N represents a number of monitoring points of the $j^{th}$ component, and $best_j$ represents an optimal state of the $j^{th}$ component.

17. The intelligent operation and maintenance optimization method for an offshore oil SPS according to claim 1, wherein the calculating toughness of the SPS under different maintenance strategies based on the dynamic health indexes at different moments comprises:
calculating a failure threshold of the SPS based on a distribution index of each component by using the following formula:

$$Ft = \begin{bmatrix} pf_1 \\ pf_2 \\ \vdots \\ pf_J \end{bmatrix}^T \times \begin{bmatrix} \xi_1 \\ \xi_2 \\ \vdots \\ \xi_J \end{bmatrix}$$

wherein Ft represents the failure threshold of the SPS, $pf_1$, $pf_2$, and $pf_J$ respectively represent failure thresholds of the $1^{st}, 2^{nd}$, and $J^{th}$ components of the SPS, and $\xi_1, \xi_2$, $\xi_J$ respectively represent the distribution indexes of the $1^{st}, 2^{nd}$, and $J^{th}$ components of the SPS; and
calculating the toughness of the SPS under different maintenance strategies based on the dynamic health indexes at different moments and the distribution index of each component by using the following formulas:

$$Re = \frac{\int_{T_s}^{T_e} RUL(t)dt}{RUL_0(T_e - T_s)}$$

-continued $$RUL_0 = \inf\{t : HI(t) \leq Ft | HI(0) > Ft\}$$

$$RUL_1 = \inf\{t : MHI(t) \leq Ft | MHI(0) > Ft\}$$

$$MHI(t) = HI(t) + E_{HI}(t)$$

$$RUL_2 = RUL_0 * (1 - c_k)$$

wherein Re represents the toughness of the SPS under a maintenance strategy for a time period from a moment $T_s$ to a moment $T_e$, $RUL_0$ represents an initial remaining useful life of the SPS, $T_s$ represents a moment at which a shock arrives, $T_e$ represents a moment at which the SPS recovers after maintenance, and RUL(t) represents a corrected remaining useful life of the SPS at a moment t between $T_s$ to $T_e$;

HI(t) represents the dynamic health index of the SPS at the moment t, HI(0) represents the dynamic health index of the SPS at the initial moment, and a value of HI(0) is equal to the static health index of the SPS;

$RUL_1$ represents a corrected remaining useful life of the SPS at the moment $T_s$, MHI(t) represents a corrected dynamic health index of the SPS at the moment t, $E_{HI}(t)$ represents an additional health index due to the shock at the moment t, and MHI(0) represents a corrected static health index; and $RUL_2$ represents a corrected remaining useful life of the SPS at the moment $T_e$, and $c_k$ represents a maintenance discount factor.

18. The intelligent operation and maintenance optimization method for an offshore oil SPS according to claim 17, wherein the failure threshold of each component of the SPS is calculated by using the following formula:

$$pf_j = \frac{ft_j}{best_j}$$

wherein $pf_j$ represents the failure threshold of the $j^{th}$ component of the SPS, $ft_j$ represents a critical state in which the $j^{th}$ component fails, and $best_j$ represents an optimal state of the $j^{th}$ component.

19. The intelligent operation and maintenance optimization method for an offshore oil SPS according to claim 17, wherein the additional health index due to the shock at the moment t is obtained through the following steps:
constructing a random shock model of the SPS, wherein the random shock model simulates the arrival of the shock as a homogeneous Poisson process and the intensity of the shock as a normal distribution; and
calculating the additional health index due to the shock based on the random shock model.

20. The intelligent operation and maintenance optimization method for an offshore oil SPS according to claim 1, wherein the maintenance cost is calculated by using the following formula:

$$Cost = C_s + C_m + C_p$$

wherein Cost represents the maintenance cost of the SPS, $C_s$ represents a material cost, $C_m$ represents a maintenance resource cost, and $C_p$ represents a downtime loss.

21. The intelligent operation and maintenance optimization method for an offshore oil SPS according to claim 1, wherein the solving the multi-objective optimization function through a multi-objective optimization solution algorithm to obtain an optimal maintenance strategy for the SPS comprises:
obtaining a plurality of maintenance strategies under which the toughness of the SPS is greater than a toughness threshold through a particle swarm optimization algorithm; and
determining the maintenance strategy with the lowest maintenance cost in the plurality of maintenance strategies as the optimal maintenance strategy.

* * * * *